(12) United States Patent
Miyabayashi

(10) Patent No.: US 6,602,333 B2
(45) Date of Patent: Aug. 5, 2003

(54) INK SET FOR INK-JET RECORDING, PROCESS FOR PRODUCING SAME, METHOD OF IMAGE RECORDING, AND PRINT

(75) Inventor: Toshiyuki Miyabayashi, Nagano (JP)

(73) Assignee: Seiko Epson Corporation, Tokyo (JP)

(\*) Notice: Subject to any disclaimer, the term of this patent is extended or adjusted under 35 U.S.C. 154(b) by 438 days.

(21) Appl. No.: 09/913,146

(22) PCT Filed: Dec. 14, 2000

(86) PCT No.: PCT/JP00/08867
§ 371 (c)(1),
(2), (4) Date: Aug. 10, 2001

(87) PCT Pub. No.: WO01/44384
PCT Pub. Date: Jun. 21, 2001

(65) Prior Publication Data
US 2003/0029355 A1 Feb. 13, 2003

(30) Foreign Application Priority Data
Dec. 16, 1999 (JP) .................................. 11-356884
Jul. 21, 2000 (JP) .................................. 2000-221565
Sep. 29, 2000 (JP) .................................. 2000-301081

(51) Int. Cl.$^7$ .............................................. C09D 11/02
(52) U.S. Cl. ................................ 106/31.27; 106/31.47; 106/31.58; 106/31.6; 106/31.77; 106/31.86; 106/31.87

(58) Field of Search .................... 106/31.27, 31.47, 106/31.58, 31.6, 31.77, 31.86, 31.87

(56) References Cited

U.S. PATENT DOCUMENTS

| | | | | |
|---|---|---|---|---|
| 5,858,075 | A | * | 1/1999 | Deardurff et al. ........ 106/31.27 |
| 6,425,662 | B1 | * | 7/2002 | Teraoka et al. ............ 347/100 |
| 2003/0008080 | A1 | * | 1/2003 | Doi et al. .................... 427/466 |
| 2003/0015120 | A1 | * | 1/2003 | Adamic et al. .......... 106/31.27 |

FOREIGN PATENT DOCUMENTS

| | | |
|---|---|---|
| JP | 10316909 | 12/1998 |
| JP | 2000169773 | 6/2000 |

\* cited by examiner

Primary Examiner—Helene Klemanski
(74) Attorney, Agent, or Firm—Ladas & Parry

(57) ABSTRACT

The present invention relates to an ink jet recording ink set comprising a plurality of ink compositions each containing at least a colorant, a water-soluble organic solvent and water; and to a preparation process thereof. The invention is characterized by that the flowing characteristics or dynamic viscoelasticity at 20° C. of each of said plurality of ink compositions are set to satisfy specific conditions. The present invention also relates to an image recording method and recorded matter having an image formed thereon, each of the image being formed using the above-described ink jet recording ink set or an ink jet recording ink set prepared by the above-described process.

51 Claims, 5 Drawing Sheets

※ The log represents common logarithm, $\dot{\gamma}$ stands for shear rate (sec$^{-1}$) and $\sigma$ stands for shear stress (Pa)

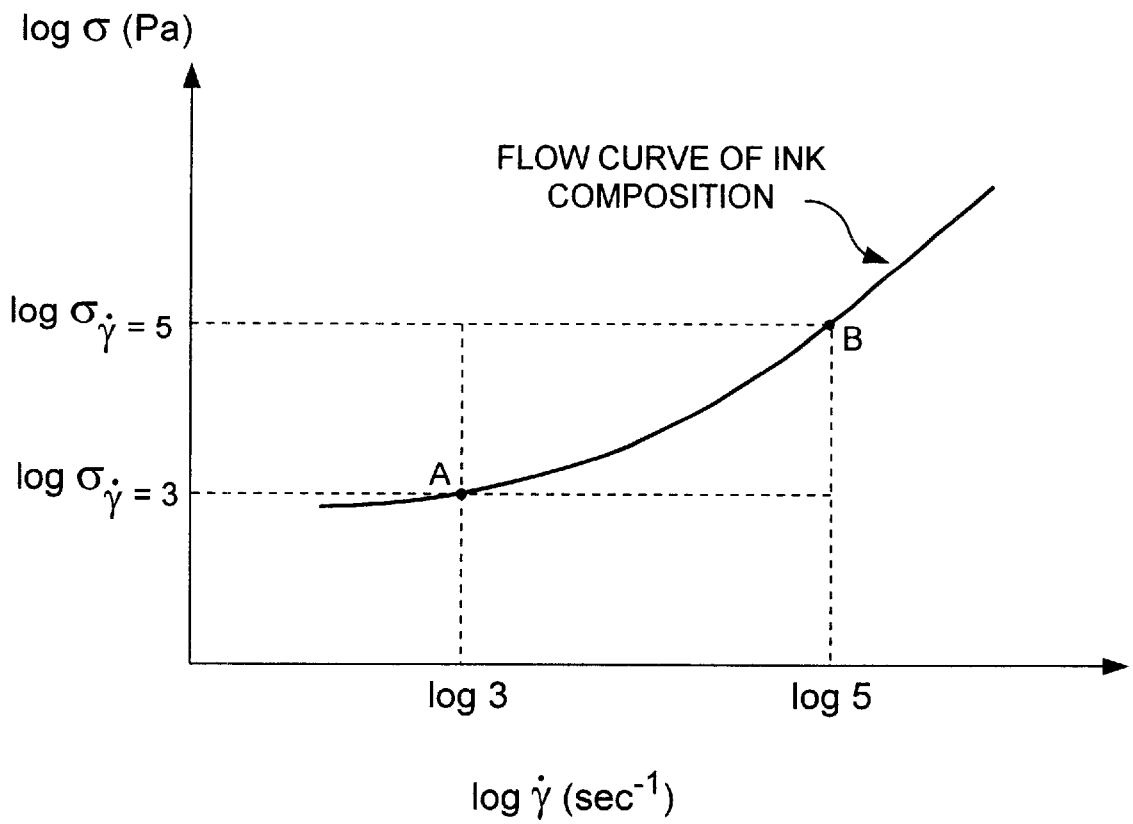
F I G. 1

※ The log represents common logarithm, $\dot{\gamma}$ stands for shear rate (sec$^{-1}$) and $\sigma$ stands for shear stress (Pa)

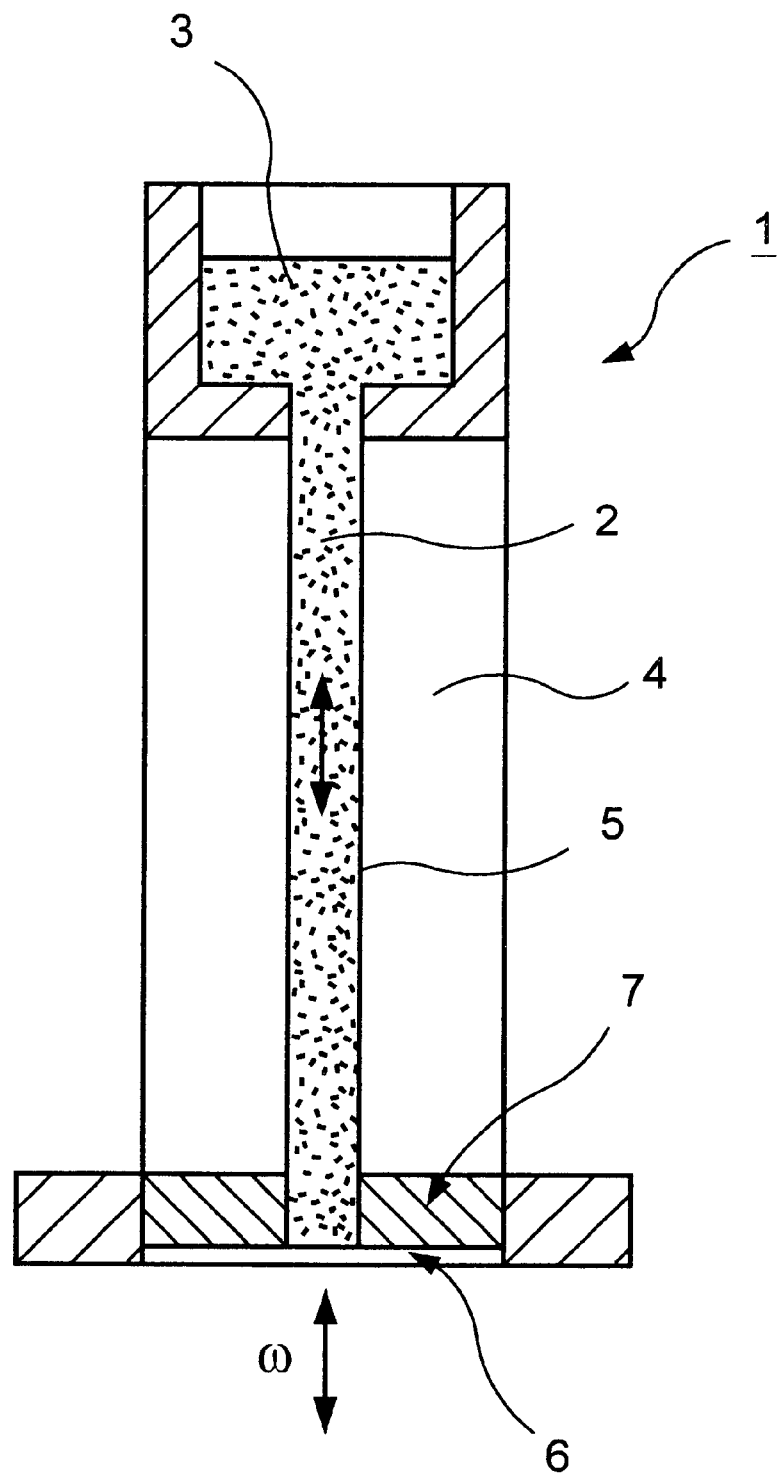
F I G. 4

INK SET FOR INK-JET RECORDING, PROCESS FOR PRODUCING SAME, METHOD OF IMAGE RECORDING, AND PRINT

TECHNICAL FIELD

The present invention relates to ink sets for ink jet recording comprising a plurality of ink compositions each containing at least a colorant, a water-soluble organic solvent and water; a preparation process of these ink sets; and image recording method and recorded matter by using them. Particularly, the invention pertains to ink sets for ink jet recording having flowing characteristics or dynamic viscoelasticity at 20° C. controlled within a specific range, whereby they can exhibit good jetting stability, suppress fluctuations, among different colors, of an ink jetting amount with high accuracy, and provide a high-quality image; preparation process of these ink sets; and image recording method and recorded matter by using them.

BACKGROUND ART

Ink jet recording is a method of carrying out printing by jetting droplets of an ink composition (which may hereinafter be called "ink" simply) and allowing them to adhere to a recording medium such as paper. Since this printing method permits high-speed and convenient printing of a high quality image with a high resolution, it has recently come to be an image forming method substitutable for photography particularly in color printing.

It is the common practice to use an ink containing a colorant, a wetting agent such as glycerin and water for this ink jet recording method.

As the colorant used for the ink of ink jet recording method, water soluble dyes have so far been employed from the viewpoints of high quality of the produced image in chroma, color reproduction and the like of the colorant, a variety of coloring materials usable for the colorant, water solubility, and reliability such as anti-clogging property.

The water-soluble dyes are sometimes inferior in water resistance or light fastness, which leads to inferiority in water resistance or light resistance of the printed matter printed by an ink containing the water-soluble dye. In recent years, for overcoming this problem, use of pigments excellent in fastness such as water resistance and light fastness or water-insoluble or water-sparingly-soluble dyes is under investigation. Such pigments or dyes, different from water-soluble dyes, lack solubility in water so that they must be dispersed stably in water. As means for preventing precipitation of pigment particles or water-insoluble or water-sparingly-soluble dyes, thereby preventing clogging, known is a method of dispersing them in an aqueous medium by using various surfactants or dispersants such as water-based resins.

Ink jet recording is a method of discharging ink droplets from a fine nozzle, thereby recording letters and graphics onto the surface of a recording medium. Examples of ink jet recording which has been developed and industrialized include a method of recording letters and graphics on the surface of a recording medium by converting electric signals to mechanical signals through electrostrictive elements and intermittently ejecting an ink reservoired in a nozzle head portion; and a method of recording letters and graphics on the surface of a recording medium by rapidly heating an ink, which has been reservoired in a nozzle head portion, in the very vicinity of the discharging portion, thereby creating a bubble and intermittently discharging the ink by making use of the volumetric expansion caused by the bubble.

Inks used for such inject recording methods are required to have a good jetting property, be free from disorders in print due to satellites, permit good printing on various recording media, and have driving frequency characteristics permitting stable ink ejection at the nozzle head which makes use of an electrostrictive element.

Particularly, an ink jet ink which contains a pigment or a water-insoluble or water-sparingly-soluble dye does not have sufficient jetting stability, so that such an ink but having improved jetting stability is desired.

An ink jet ink which contains a pigment or a water-insoluble or water-sparingly-soluble dye has sometimes suffered a problem in long-term stability due to precipitation of a colorant.

On the other hand, examples of a method of using a microcapsule for an ink jet ink include a method disclosed in JP-B-62-95366 which comprises using, for a recording liquid, a microcapsule having, encapsulated therein, a dye ink contained in polymer particles; a method disclosed in JP-B-1-170672 which comprises using, as a recording liquid, a micro-encapsulated colorant obtained by dissolving or dispersing a colorant in a substantially water-insoluble solvent, emulsifying and dispersing the solution or dispersion in water by using a surfactant and then micro-encapsulating the emulsion in a conventional manner; a method disclosed in JP-B-5-39447 which comprises using, as a recording liquid, a microcapsule having, encapsulated therein, a solution or dispersion of a sublimable disperse dye in at least one of water, a water-soluble solvent and a polyester resin; and an aqueous ink composition disclosed in JP-B-6-313141 which comprises colored emulsion polymer particles and various water-based materials.

The above-described techniques are effective for improving water resistance, light fastness and storage stability of ink, but is accompanied with the problem in jetting stability, more specifically, ink droplets do not always jet out straight upon continuous printing.

The ink used for ink jet recording should be free from feathering upon printing on paper which is a medium to be printed, be dried quickly, permit uniform printing on the surface of any recording medium, and upon multicolor printing, be free from color-to-color intermixing. Here, feathering upon use of paper as a medium to be printed is a particular problem to be solved.

Upon industrialization of conventional inks, particularly, many of the inks using a colorant as a pigment, investigation has been conducted to maintain their printing quality by suppressing their penetration, thereby suppressing wetting of the paper surface by them and retaining ink droplets near the surface of paper. Inks having reduced wetness to paper, however, differ largely in a feathering degree, depending on the kind of paper. Particularly in recycled paper comprising various fiber components, feathering appeared owing to a difference in wet properties of the ink to the components. Such inks are accompanied with further problems that they need much drying time, which inevitably causes intermixing of adjacent colors upon multicolor printing, and that the pigment used as a colorant remains on the surface of paper to deteriorate scratch resistance.

There is an attempt to improve penetration of an ink to paper with a view to overcoming the above-described problems. Under investigation are addition of diethylene glycol monobutyl ether as described in U.S. Pat. No. 5,156,675, addition of "Surfynol 465" (manufactured by Nisshin Chemical Industry Co., Ltd.) as an acetylene glycol surfactant as described in U.S. Pat. No. 5,183,502, addition of both diethylene glycol monobutyl ether and "Surfynol 465" as described in U.S. Pat. No. 5,196,056. Diethylene glycol mono-n-butyl ether is known as butyl carbitol and it is described, for example, in U.S. Pat. No. 3,291,580. Use of an ether such as diethylene glycol for an ink is investigated in U.S. Pat. No. 2,083,372.

Particularly in an ink using a pigment as a colorant, glycol ether is used in combination therewith. Examples include use of triethylene glycol monomethyl ether as described in JP-A-56-147861 and use of an ether such as ethylene glycol, diethylene glycol or triethylene glycol as described in JP-A-9-111165.

Particularly when a pigment is used as a colorant, however, the resulting ink tends to involve a problem in jetting stability, for example, ink droplets do not jet out straight.

An ink set obtained by using in combination the above-described inks different in color has been proposed.

It is not possible to assert that an ink set equipped with a plurality of inks different in color having pigment particles dispersed on an aqueous medium is sufficient in jetting stability (property of an ink stably jetted into a fixed direction from the head of an ink jet printer) of each of the inks and suppression of fluctuations in the ink jetting amount among colors. There is accordingly a strong demand for an ink jet recording ink set having a plurality of ink compositions each containing a pigment as a colorant and capable of realizing an image of high quality.

With the above-described problems in view, the present invention has been made. An object of the present invention is therefore to provide an ink jet recording ink set equipped with a plurality of ink compositions each containing at least a colorant, a water-soluble organic solvent and water, which can realize a high-quality image by attaining jetting stability of each of ink and suppressing fluctuations of an ink jetting amount among colors with high accuracy; a preparation process of the ink set; an image recording method capable of producing a high-quality image; and a high-image-quality recorded matter.

DISCLOSURE OF THE INVENTION

As a result of intensive investigation, the present inventors have surprisingly found that an ink jet recording ink set comprising a plurality of ink compositions can exhibit stable jetting property, permit suppression of fluctuations in the ink jetting amount among colors with high accuracy, and realize an image of a markedly high quality by adjusting flowing characteristics (which may be called "static viscoelasticity", and which will be applied equally hereinafter) or dynamic viscoelasticity of each of the ink compositions at 20° C. to fall within a specific range. Based on this finding, the invention has been completed. That is, the present invention is as follows.

<First Ink Jet Recording Ink Set According to the Invention>

The first ink jet recording ink set according to the invention comprises a plurality of ink compositions each containing at least a colorant, a water-soluble organic solvent and water, wherein among the plurality of ink compositions, a difference in zero shear viscosity which is a value at sin θ=0 (θ=0) in a sin θ vs. viscosity curve is 0.2 mPa·s or less and a difference in the slope of the sin θ vs. viscosity curve is within 0.04, said sin θ vs. viscosity curve being obtained by carrying out rolling-ball system measurement of the viscosity of each of the ink compositions under the temperature condition of 20° C. while changing an inclination angle θ to predetermined angles, determining the viscosity at the predetermined angles, and plotting the sin θ and the viscosity along the abscissa and the ordinate, respectively. The zero shear viscosities are preferably from 3 to 10 mPa·s and the slopes are preferably from −0.1 to 0.

<Second Ink Jet Recording Ink Set According to the Invention>

The second ink jet recording ink set according to the invention comprises a plurality of ink compositions each containing at least a colorant, a water-soluble organic solvent and water, wherein the flowing characteristics of each of the plurality of ink compositions at 20° C. are set to satisfy the below-described expression (I):

$$0.6 \leq \frac{\log \sigma_{\gamma=5} - \log \sigma_{\gamma=3}}{\log 5 - \log 3} \leq 1 \tag{I}$$

wherein $\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

It is more preferred to set the flowing characteristics of each of the plurality of ink compositions at 20° C. to satisfy the following expression (II):

$$0.8 \leq \frac{\log \sigma_{\gamma=5} - \log \sigma_{\gamma=3}}{\log 5 - \log 3} \leq 1 \tag{II}$$

wherein $\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

It is especially preferred to set the flowing characteristics of each of the plurality of ink compositions at 20° C. to satisfy the following expression (III):

$$0.9 \leq \frac{\log \sigma_{\gamma=5} - \log \sigma_{\gamma=3}}{\log 5 - \log 3} \leq 1 \tag{III}$$

wherein $\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

<Third Ink Jet Recording Ink Set According to the Invention>

The third ink jet recording ink set according to the invention comprises a plurality of ink compositions each containing at least a colorant, a water-soluble organic solvent and water, wherein the flowing characteristics of each of the plurality of ink compositions at 20° C. are set to satisfy the below-described expression (IV):

$$0.6 \leq \frac{\log \sigma_{\gamma=4 \times 10^4} - \log \sigma_{\gamma=3 \times 10^4}}{\log(4 \times 10^4) - \log(3 \times 10^4)} \leq 1 \tag{IV}$$

wherein $\sigma_{\gamma=3 \times 10^4}$: shear stress (Pa) when the shear rate of the ink is $3 \times 10^4$ (sec$^{-1}$), and $\sigma_{\gamma=4 \times 10^4}$: shear stress (Pa) when the shear rate of the ink is $4 \times 10^4$ (sec$^{-1}$).

It is more preferred to set the flowing characteristics of each of the plurality of ink compositions at 20° C. to satisfy the following expression (V):

$$0.8 \leq \frac{\log\sigma_{\gamma=4\times10^4} - \log\sigma_{\gamma=3\times10^4}}{\log(4\times 10^4) - \log(3\times 10^4)} \leq 1 \quad (V)$$

wherein $\sigma_{\gamma=3\times10^4}$: shear stress (Pa) when the shear rate of the ink is $3\times10^4$ (sec$^{-1}$), and $\sigma_{\gamma=4\times10^4}$: shear stress (Pa) when the shear rate of the ink is $4\times10^4$ (sec$^{-1}$).

It is especially preferred to set the flowing characteristics of each of the plurality of the ink compositions at 20° C. to satisfy the following expression (VI):

$$0.9 \leq \frac{\log\sigma_{\gamma=4\times10^4} - \log\sigma_{\gamma=3\times10^4}}{\log(4\times 10^4) - \log(3\times 10^4)} \leq 1 \quad (VI)$$

wherein $\sigma_{\gamma=3\times10^4}$: shear stress (Pa) when the shear rate of the ink is $3\times10^4$ (sec$^{-1}$), and $\sigma_{\gamma=4\times10^4}$: shear stress (Pa) when the shear rate of the ink is $4\times10^4$ (sec$^{-1}$).

<Fourth Ink Jet Recording Ink Set According to the Invention>

The fourth ink jet recording ink set according to the invention comprises a plurality of ink compositions each containing at least a colorant, a water-soluble organic solvent and water, wherein the dynamic viscoelasticity of each of the plurality of ink compositions at 20° C. are set to satisfy the below-described expression (VII):

$$1.2 \leq \frac{\log G'_{\omega=0.8} - \log G'_{\omega=0.6}}{\log 0.8 - \log 0.6} \leq 2 \quad (VII)$$

wherein $G'_{107\ =0.6}$: storage shear modulus (Pa) when frequency ($\omega$) applied to the ink composition is 0.6 rad/s, and, $G'_{107\ =0.8}$: storage shear modulus (Pa) when frequency ($\omega$) applied to the ink composition is 0.8 rad/s.

It is more preferred to set the dynamic viscoelasticity of each of the plurality of ink compositions at 20° C. to satisfy the following expression (VIII):

$$1.6 \leq \frac{\log G'_{\omega=0.8} - \log G'_{\omega=0.6}}{\log 0.8 - \log 0.6} \leq 2 \quad (VIII)$$

wherein $G'_{107\ =0.6}$: storage shear modulus (Pa) when frequency ($\omega$) applied to the ink composition is 0.6 rad/s, and, $G'_{107\ =0.8}$: storage shear modulus (Pa) when frequency ($\omega$) applied to the ink composition is 0.8 rad/s.

It is especially preferred to set the dynamic viscoelasticity of each of the plurality of ink compositions at 20° C. to satisfy the following expression (IX):

$$1.8 \leq \frac{\log G'_{\omega=0.8} - \log G'_{\omega=0.6}}{\log 0.8 - \log 0.6} \leq 2 \quad (IX)$$

wherein $G'_{107\ =0.6}$: storage shear modulus (Pa) when frequency ($\omega$) applied to the ink composition is 0.6 rad/s, and, $G'_{107\ =0.8}$: storage shear modulus (Pa) when frequency ($\omega$) applied to the ink composition is 0.8 rad/s.

In a preferred embodiment of each of the first to fourth ink jet recording ink sets according to the invention, the colorant is a pigment.

In another preferred embodiment of each of the first to fourth ink jet recording ink sets according to the invention, the colorant is a self-dispersion type pigment having a hydrophilized surface and more preferably, the self-dispersion type pigment having a surface hydrophilized by a functional group selected from a class consisting of a carbonyl group, a carboxyl group, a hydroxyl group, a sulfone group or a sulfonic acid group or salts thereof.

A further preferred embodiment of each of the first to fourth ink jet recording ink sets according to the invention, the colorant is a micro-encapsulated pigment, more preferably, the micro-encapsulated pigment having the pigment coated with a polymer compound.

Preferred examples of the polymer compound include those mainly comprising at least one compound selected from the group consisting of vinyl-based polymer compounds, polyesters, polyamides, polyimides, polyurethanes, amino-based polymer compounds, silicon-containing polymers, sulfur-containing polymers, fluorine-containing polymers and epoxy resins; and those having a crosslinked structure obtained by enclosing a pigment with an organic phase containing at least a polymer compound having both a crosslinkable group and a hydrophilic group and a crosslinking agent and then carrying out crosslinking reaction.

As the polymer compound, polymer compounds obtained by polymerizing a polymerizable surfactant having a polymerizable group, a hydrophobic group and a hydrophilic group with a monomer are also preferred.

As the above-described polymerizable group, an unsaturated hydrocarbon group is preferred. More specifically, at least one group selected from the class consisting of vinyl, allyl, acryloyl, methacryloyl, propenyl, vinylidene and vinylene groups is more preferred.

As the hydrophilic group of the above-described polymerizable surfactant, at least one group selected from the class consisting of sulfone, sulfonic acid, carboxyl, carbonyl and hydroxyl groups and salts thereof is preferred.

As the above-described monomer, a monomer containing a crosslinkable monomer is preferred.

In a still further preferred embodiment of each of the first to fourth ink jet recording ink sets according to the invention, the colorant is a dye which is selected from disperse dyes and oil soluble dyes and is insoluble or sparingly soluble in water.

In a preferred embodiment of each of the first to fourth ink jet recording ink sets according to the invention, the colorant has been dispersed in an aqueous medium by a dispersant, which is preferably a polymer dispersant or a surfactant. More preferably, the polymer dispersant comprises a polymer which has, in the molecule thereof, at least a moiety having an aromatic ring and/or an aliphatic ring and a moiety having a carboxyl group and/or a sulfonic acid group, and/or a salt of the polymer.

In a preferred embodiment of each of the first to fourth ink jet recording ink sets according to the invention, the plurality of ink compositions each contains polymer fine particles.

Preferably, the polymer fine particles have a film forming property, have a hydrophilic group on the surface thereof and have a particle size of 50 to 200 nm. More preferably, the hydrophilic group is a sulfonic acid group or salt thereof. Here, the polymer fine particles are preferably added, to the ink composition, in the form of a polymer emulsion having water as a continuous phase.

In the preferred embodiment of each of the first to fourth ink jet recording ink sets according to the invention, each of the plurality of ink compositions contains a polar solvent. As the polar solvent, preferred is that contains at least one selected from the group consisting of 2-pyrrolidone, N-methylpyrrolidone, $\epsilon$-caprolactam, dimethyl sulfoxide, sulfolane, morpholine, N-ethylmorpholine and 1,3-dimethyl-2-imidazolidinone.

In a preferred embodiment of each of the first to fourth ink jet recording ink sets according to the invention, the plurality of ink compositions each contains an anionic surfactant and/or a nonionic surfactant. Here, the ink compositions each contains an acetylene glycol compound as the nonionic surfactant.

In a preferred embodiment of each of the first to fourth ink jet recording ink sets according to the invention, the ink compositions each contains a glycol ether.

In a preferred embodiment of each of the first to fourth ink jet recording ink sets according to the invention, the ink compositions each contains a 1,2-alkyldiol.

In a preferred embodiment of each of the first to fourth ink jet recording ink sets according to the invention, the ink compositions each has a surface tension of 20 to 45 mN/m.

<A First Preparation Process of an Ink Jet Recording Ink Set According to the Invention>

A first process for preparing an ink jet recording ink set, which comprises a plurality of ink compositions containing at least a colorant, a water-soluble organic solvent and water, according to the invention comprises adjusting each of the plurality of ink compositions so that in a sin θ vs. viscosity curve obtained by carrying out rolling-ball system measurement of the viscosity of each of the ink compositions under the temperature condition of 20° C. while changing an inclination angle θ to predetermined angles, determining the viscosity at the predetermined angles, and plotting the sin θ and the viscosity along the abscissa and the ordinate, respectively, a difference in zero shear viscosity which is the value at sin θ=0 (θ=0) is 0.2 mPa·s or less, and at the same time, a difference of the slope of the sin θ vs. viscosity curve is within 0.04. More preferably, the ink compositions are each adjusted to have a zero shear viscosity ranging from 3 to 10 mPa·s and the slope ranging from −0.1 to 0.

<A Second Preparation Process of an Ink Jet Recording Ink Set According to the Invention>

A second process for preparing an ink jet recording ink set, which comprises a plurality of ink compositions containing at least a colorant, a water-soluble organic solvent and water, according to the invention comprises adjusting the flowing characteristics at 20° C. of each of the plurality of ink compositions to satisfy the following expression (I):

$$0.6 \leq \frac{\log \sigma'_{\dot{\gamma}=5} - \log \sigma'_{\dot{\gamma}=3}}{\log 5 - \log 3} \leq 1 \quad (I)$$

wherein $\sigma_{65\,=3}$: shear stress (Pa) when the shear rate of the ink is 3 (sec$^{-1}$), and $\sigma_{65\,=5}$: shear stress (Pa) when the shear rate of the ink is 5 (sec$^{-1}$).

It is more preferred to adjust the flowing characteristics at 20° of each of the ink compositions to satisfy the following expression (II):

$$0.8 \leq \frac{\log \sigma'_{\dot{\gamma}=5} - \log \sigma'_{\dot{\gamma}=3}}{\log 5 - \log 3} \leq 1 \quad (II)$$

wherein $\sigma_{65\,=3}$: shear stress (Pa) when the shear rate of the ink is 3 (sec$^{-1}$), and $\sigma_{65\,=5}$: shear stress (Pa) when the shear rate of the ink is 5 (sec$^{-1}$).

It is further more preferred to adjust the flowing characteristics at 20° C. of each of the ink compositions to satisfy the following expression (III):

$$0.9 \leq \frac{\log \sigma'_{\dot{\gamma}=5} - \log \sigma'_{\dot{\gamma}=3}}{\log 5 - \log 3} \leq 1 \quad (III)$$

wherein $\sigma_{65\,=3}$: shear stress (Pa) when the shear rate of the ink is 3 (sec$^{-1}$), and $\sigma_{65\,=5}$: shear stress (Pa) when the shear rate of the ink is 5 (sec$^{-1}$).

<A Third Preparation Process of an Ink Jet Recording Ink Set According to the Invention>

A third process for preparing an ink jet recording ink set, which comprises a plurality of ink compositions each containing at least a colorant, a water-soluble organic solvent and water, according to the invention comprises adjusting the flowing characteristics at 20° C. of each of the plurality of ink compositions to satisfy the below-described expression (IV):

$$0.6 \leq \frac{\log \sigma'_{\dot{\gamma}=4\times 10^4} - \log \sigma'_{\dot{\gamma}=3\times 10^4}}{\log(4 \times 10^4) - \log(3 \times 10^4)} \leq 1 \quad (IV)$$

wherein $\sigma_{\dot{\gamma}=3\times 10^4}$: shear stress (Pa) when the shear rate of the ink is 3×10$^4$ (sec$^{-1}$), and $\sigma_{\dot{\gamma}=4\times 10^4}$: shear stress (Pa) when the shear rate of the ink is 4×10$^4$ (sec$^{-1}$).

It is more preferred to adjust the flowing characteristics at 20° C. of each of the plurality of ink compositions to satisfy the following expression (V):

$$0.8 \leq \frac{\log \sigma'_{\dot{\gamma}=4\times 10^4} - \log \sigma'_{\dot{\gamma}=3\times 10^4}}{\log(4 \times 10^4) - \log(3 \times 10^4)} \leq 1 \quad (V)$$

wherein $\sigma_{\dot{\gamma}=3\times 10^4}$: shear stress (Pa) when the shear rate of the ink is 3×10$^4$ (sec$^{-1}$), and $\sigma_{\dot{\gamma}=4\times 10^4}$: shear stress (Pa) when the shear rate of the ink is 4×10$^4$ (sec$^{-1}$).

It is especially preferred to adjust the flowing characteristics at 20° C. of each of the plurality of ink compositions to satisfy the following expression (VI):

$$0.9 \leq \frac{\log \sigma'_{\dot{\gamma}=4\times 10^4} - \log \sigma'_{\dot{\gamma}=3\times 10^4}}{\log(4 \times 10^4) - \log(3 \times 10^4)} \leq 1 \quad (VI)$$

wherein $\sigma_{\dot{\gamma}=3\times 10^4}$: shear stress (Pa) when the shear rate of the ink is 3×10$^4$ (sec$^{-1}$), and $\sigma_{\dot{\gamma}=4\times 10^4}$: shear stress (Pa) when the shear rate of the ink is 4×10$^4$ (sec$^{-1}$).

<A fourth Preparation Process of an Ink Jet Recording Ink Set According to the Invention>

A fourth process for preparing an ink jet recording ink set, which comprises a plurality of ink compositions each containing at least a colorant, a water-soluble organic solvent and water, according to the invention comprises adjusting the dynamic viscoelasticity of each of the plurality of ink compositions at 20° C. to satisfy the following expression (VII):

$$1.2 \leq \frac{\log G'_{\omega=0.8} - \log G'_{\omega=0.6}}{\log 0.8 - \log 0.6} \leq 2 \quad (VII)$$

wherein $G'_{\omega=0.6}$: storage shear modulus (Pa) when frequency (ω) applied to the ink composition is 0.6 rad/s, and, $G'_{\omega=0.8}$: storage shear modulus (Pa) when frequency (ω) applied to the ink composition is 0.6 rad/s.

It is more preferred to adjust the dynamic viscoelasticity of each of the plurality of the ink compositions at 20° C. to satisfy the following expression (VIII):

$$1.6 \leq \frac{\log G'_{\omega=0.8} - \log G'_{\omega=0.6}}{\log 0.8 - \log 0.6} \leq 2 \tag{VIII}$$

wherein $G'_{\omega=0.6}$: storage shear modulus (Pa) when frequency ($\omega$) applied to the ink composition is 0.6 rad/s, and, $G'_{\omega=0.8}$: storage shear modulus (Pa) when frequency ($\omega$) applied to the ink composition is 0.8 rad/s.

It is especially preferred to adjust the dynamic viscoelasticity of each of the plurality of the ink compositions at 20° C. to satisfy the following expression (IX):

$$1.8 \leq \frac{\log G'_{\omega=0.8} - \log G'_{\omega=0.6}}{\log 0.8 - \log 0.6} \leq 2 \tag{IX}$$

wherein $G'_{\omega=0.6}$: storage shear modulus (Pa) when frequency ($\omega$) applied to the ink composition is 0.6 rad/s, and, $G'_{\omega=0.8}$: storage shear modulus (Pa) when frequency ($\omega$) applied to the ink composition is 0.8 rad/s.

<An Image Recording Method According to the Invention>

According to the invention, an image is formed by using any one of the first to fourth ink jet recording ink sets of the invention or the ink jet recording ink set obtained by any one of the first to fourth preparation processes of the invention.

<A Recorded Matter According to the Invention>

The recorded matter of the invention has an image formed thereon by using any one of the first to fourth ink jet recording ink sets of the invention or the ink jet recording ink set obtained by any one of the first to fourth preparation processes of the invention.

BEST MODE FOR CARRYING OUT THE INVENTION

Modes for carrying out the ink jet recording ink sets (first to fourth ink jet recording ink sets), preparation process thereof, image recording method and recorded matter, each according to the invention, will next be described specifically. The term "ink set for ink jet recording according to the invention, or ink jet recording ink set according to the invention" will hereinafter be called "ink set of the invention" unless otherwise specifically indicated.

Each of the first to fourth ink sets of the invention comprises a plurality of ink compositions, usually, ink compositions of at least three different colors. Examples of the combination include four ink compositions of a magenta ink, a yellow ink, a cyan ink and a black ink and seven ink compositions of a black ink and magenta, yellow and cyan inks, each two different color shades. In addition, an orange ink or green ink can be used in combination with them.

The first to fourth ink sets of the invention will hereinafter be described.

<First Ink Set of the Invention>

The first ink set of the invention comprises a plurality of ink compositions containing at least a colorant, a water-soluble organic solvent and water, wherein in a sin θ vs. viscosity curve obtained by carrying out rolling-ball system measurement of the viscosity of each of the ink compositions under the temperature condition of 20° C. while changing an inclination angle θ to predetermined angles, determining the viscosity at the predetermined angles, and plotting the sin θ and the viscosity along the abscissa and the ordinate, respectively, a difference in zero shear viscosity which is the value at sin θ=0 (θ=0) is 0.2 mPa·s or less, preferably 0.05 mPa·s or less and at the same time, a difference in the slope of the sin θ vs. viscosity curve is within 0.04, preferably within 0.02.

The above-described rolling-ball system viscosity measurement can be carried out by the method described in DIN 53015 or ISO/DIS 12058. For example, an automated microviscometer (rolling ball system) "AMVn" (trade name) manufactured by Paar Physica can be employed for the measurement.

The term "difference" means a difference in zero shear viscosity between the maximum and minimum values among the plurality of ink compositions.

When the difference in zero shear viscosity exceeds 0.2 mPa·s, there appears a difference in the ink jetting amount among inks, causing a difference in the input amount to a medium to be recorded and then, a difference in the dot diameter formed by landed liquid droplets, which makes it impossible to obtain the desired image. Described specifically, when the dot diameter varies depending on the color, all the colors are not filled by printing under the same operating conditions of a printer. If color is reproduced by mixing, the target color is not always available.

When the above-described difference in the slope exceeds 0.04, there appears a difference in jetting property, more specifically, in flight stability among inks, which prevents ink droplets from landing at a desired position. As a result, the color tone thus obtained is not desired one and quality of the image becomes inferior. More specifically, color mixing brings about not a desired color but an undesired color.

A description will next be made of the rolling-ball system viscosity measurement in further detail. Measurement is conducted, for example, by introducing a sample in a glass-made capillary controlled at a constant temperature, dropping a gold-plated steel ball in the capillary, measuring its dripping rate by a light sensor and after measurement several times, calculating the viscosity in accordance with the below-described expression.

$$\eta = K \cdot t \cdot \Delta \rho \qquad \text{Equation}$$

$\eta$: viscosity (mPa·s)

$\Delta \rho$: difference in density between the sample and steel ball $$\Delta \rho = \rho_k - \rho_s$$

$\rho_k$: density of the steel ball (7.85 g/cm³)

$\rho_s$: density of the sample

K: correction coefficient (g/cm³)

t: time (s) necessary for rolling 100 mm

The specifications of an apparatus used upon this measurement can be adjusted as follows:

Viscosity range measured: 0.3 to 1000 mPa·s

Reproduction: within 0.35%

Capillary diameter: 1.6, 1.8, 3, 4 mm (glass)

Ball diameter: 0.8, 1.0, 1.5, 3.0 mm (stainless steel)

Measuring temperature: 10 to 70° C.

Specific measuring conditions can be set as described below and in preparation examples which will be described later, measurement is conducted under the following conditions.

Capillary diameter: 1.600 mm

Ball diameter: 1.500 mm

Ball density: 7.850 g/cm³

Measuring temperature: 20° C.

The reason why viscosity is measured at every inclination angle θ is as follows. When a shear rate is considered as a substitution for an inclination angle θ, the smaller the θ is, the smaller the shear rate is, and the larger the θ is, the larger the shear rate is. This means that a change in the viscosity of a sample liquid depending on θ is shear rate dependence of the viscosity of the liquid. The "shear rate" as used herein means a shear rate in a low shear rate region. The viscosity of a Newtonian fluid such as water does not depend on θ, while that of a non-Newtonian fluid depends on θ. This explains the meaning of measuring viscosity at every inclination angle θ.

No particular limitation is imposed on each of the ink compositions to be incorporated in the ink set of the invention insofar as the above-described difference in zero shear viscosity and the above-described difference in the slope fall within the above-described ranges, respectively.

Among such ink compositions, preferred is an ink composition containing at least a colorant, a water-soluble organic solvent and water, having the above-described zero shear viscosity of, preferably, 3 to 10 mPa·s, more preferably 3 to 5 mPa·s, and having the above-described slope of the sin θ vs. viscosity curve falling within a range of, preferably, −0.1 to 0, more preferably −0.05 to 0.

When the above-described zero shear viscosity is less than 3 mPa·s, small-diameter droplets, that is, satellites appear, presumably causing a deterioration in the printing quality. Zero shear viscosities exceeding 10 mPa·s, on the other hand, prevent smooth ink ejection or even if the ink is ejected, the ejection rate becomes slow. Also in this case, a deterioration in the printing quality presumably occurs.

When the above-described slope is less than −0.1, flight stability of ink droplets is not available, presumably causing a deterioration in the printing quality. When it exceeds 0, on the other hand, there is a potential danger of causing a problem in jetting stability such as jetting failure.

<Second Ink Set of the Invention>

The second ink set of the invention is an ink jet recording ink set having a plurality of ink compositions containing at least a colorant, a water-soluble organic solvent and water, wherein the flowing characteristics-of each of the plurality of ink compositions at 20° C. are set to satisfy the below-described expression (I):

$$0.6 \leq \frac{\log \sigma_{\gamma=5} - \log \sigma_{\gamma=3}}{\log 5 - \log 3} \leq 1 \quad (I)$$

wherein $\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

First, the above-described expression (I) will be described specifically with reference to FIG. 1.

FIG. 1 is a schematic view of flowing characteristics curve (which is also called static viscoelasticity curve) of an ink composition at 20° C., with the common logarithm of a shear rate (sec$^{-1}$) and the common logarithm of a shear stress (Pa) plotted on the abscissa and ordinate, respectively.

When the shear rate and shear stress are plotted by log—log scale, a Newtonian fluid shows a straight line with a slope of 1 (Pa/sec$^{-1}$). The ink composition containing, as a colorant, a pigment or a water-insoluble or water-sparingly-soluble dye in the form of particles (these particles will hereinafter be called "colorant particles") tends to be a non-Newtonian fluid. In this case, the graph shows a curve, which is presumed to owe to the interaction between colorant particles in the ink composition.

The below-described expression (I-1) in the expression (I) is a slope of the line A–B in FIG. 1 when the points A and B are determined as described in the expression (I-2). The expression (I) indicates that the slope of the line A–B falls within a range of from 0.6 (Pa/sec$^{-1}$) to 1 (Pa/sec$^{-1}$).

$$\frac{\log \sigma_{\gamma=5} - \log \sigma_{\gamma=3}}{\log 5 - \log 3} \quad (I\text{-}1)$$

$$A(\log 3, \log \sigma_{\gamma=3}) \quad (I\text{-}2)$$
$$B(\log 5, \log \sigma_{\gamma=5})$$

More preferably, the second ink set of the invention is an ink jet recording ink set having a plurality of ink compositions containing at least a colorant, a water-soluble organic solvent and water, wherein the flowing characteristics of each of the plurality of ink compositions at 20° C. are set to satisfy the below-described expression (II):

$$0.8 \leq \frac{\log \sigma_{\gamma=5} - \log \sigma_{\gamma=3}}{\log 5 - \log 3} \leq 1 \quad (II)$$

$\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

The below-described expression (II-1) in the expression (II) is a slope of the line A–B in FIG. 1 when the points A and B are determined as described in the expression (I). The expression (II) indicates that the slope of the line A–B falling within a range of from 0.8 (Pa/sec$^{-1}$) to 1 (Pa/sec$^{-1}$).

$$\frac{\log \sigma_{\gamma=5} - \log \sigma_{\gamma=3}}{\log 5 - \log 3} \quad (II\text{-}1)$$

It is especially preferred that a second ink set is an ink jet recording ink set having a plurality of ink compositions containing at least a colorant, a water-soluble organic solvent and water, wherein the flowing characteristics of each of the plurality of ink compositions at 20° C. are set to satisfy the below-described expression (III):

$$0.9 \leq \frac{\log \sigma_{\gamma=5} - \log \sigma_{\gamma=3}}{\log 5 - \log 3} \leq 1 \quad (III)$$

wherein $\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

The below-described expression (III-1) in the expression (III) is a slope of the line A–B in FIG. 1 when the points A and B are determined as determined in the expression (I). The expression (III) indicates that the slope of the line A–B falling within a range of from 0.9 (Pa/sec$^{-1}$) to 1 (Pa/sec$^{-1}$).

$$\frac{\log \sigma_{\gamma=5} - \log \sigma_{\gamma=3}}{\log 5 - \log 3} \quad (III\text{-}1)$$

In the ink jet recording ink set having a plurality ink compositions each containing at least a colorant, a water-soluble organic solvent and water, by setting the flowing characteristics of each of the ink compositions to satisfy the expression (I), preferably the expression (II), more preferably the expression (III) as described above, jetting stability of each of the ink compositions and inhibition of fluctuations in the ink ejected amount among different colors can be attained with high accuracy, whereby a markedly high-quality image is available.

Slopes of the line A–B less than 0.6 (Pa/sec$^{-1}$) heighten the interaction (attracting force) among the ink compositions, deteriorate dispersibility, lower the jetting stability of each of the ink compositions and increase the fluctuations in the ink jetting amount among different colors, making it difficult to form a high quality image. When the slope is 1 (Pa/sec$^{-1}$), the ink composition shows Newtonian fluidity so that the slope of the line A–B never exceeds 1 (Pa/sec$^{-1}$).

Here, the flowing characteristics (relation between shear rate and shear stress) of the ink composition at 20° C. is measured using a rotational viscometer. The rotational viscometer can be classified by the shape of the measuring section into a double cylinder type, a cone-disc type, and a parallel disc type. The double cylinder type and cone-disc type are particularly preferred. When the double cylinder type is employed, the flowing characteristics of the ink composition are determined from a torque generated by filling the ink composition in a space between the wider cylinder and a thinner cylinder hung down therein so as to let their axes coincide each other, and rotating the cylinders at a predetermined angular velocity. When the cone-disc type is employed, on the other hand, the flowing characteristics of the ink composition are determined from a torque generated by filling the ink composition in a space between the cone and disc disposed in horizontally parallel each other so as to place their centers on the same vertical axis and then rotating the disc or cone plate at a predetermined angular velocity.

The shear rate to be paid attention in the second ink set of the invention ranges from 3 (sec$^{-1}$) to 5 (sec$^{-1}$) so that use of a viscometer permitting accuracy within this range is preferred. Examples of such a viscometer include "Fluids Spectrometer RFS-2" manufactured by Rheometric Science and "PHYSIFCA MCR300" of Paar Physica.

In the second ink set of the invention, the shear rate to be paid attention ranges from 3 (sec$^{-1}$) to 5 (sec$^{-1}$) in the above-described expressions (I), (II) and (III).

The slope of the line A–B in FIG. 1 can be determined by measuring the shear stresses at the shear rates of 3 (sec$^{-1}$) and 5 (sec$^{-1}$), respectively.

<Third Ink Set According to the Invention>

The third ink set of the invention is an ink jet recording ink set having a plurality of ink compositions each containing at least a colorant, a water-soluble organic solvent and water, wherein the flowing characteristics of each of the plurality of ink compositions at 20° C. are set to satisfy the below-described expression (IV):

$$0.6 \leq \frac{\log \sigma_{\gamma=4\times10^4} - \log \sigma_{\gamma=3\times10^4}}{\log(4\times10^4) - \log(3\times10^4)} \leq 1 \quad \text{(IV)}$$

wherein $\sigma_{\gamma=3\times10^4}$: shear stress (Pa) when the shear rate of the ink is $3\times10^4$ (sec$^{-1}$), and $\sigma_{\gamma=4\times10^4}$: shear stress (Pa) when the shear rate of the ink is $4\times10^4$ (sec$^{-1}$).

First, the above-described expression (IV) will be described specifically with reference to FIG. 2.

FIG. 2 is a schematic view of flowing characteristics curve (which is also called static viscoelasticity curve) of an ink composition at 20° C., with the common logarithm of a shear rate (sec$^{-1}$) and the common logarithm of a shear stress (Pa) plotted on the abscissa and ordinate, respectively, as in FIG. 1.

As described above, when the shear rate and shear stress are plotted by log—log scale, a Newtonian fluid shows a straight line with a slope of 1 (Pa/sec$^{-1}$). An ink composition containing, as a colorant, a pigment or a water-insoluble or water-sparingly-soluble dye in the form of particles tends to be a non-Newtonian fluid. In this case, the graph shows a curve, which is presumed to owe to the interaction between colorant particles in the ink composition.

The below-described expression (IV-1) in the expression (IV) is a slope of the line C–D in FIG. 2 when the points C and D are determined as described in the formula (IV-2). The expression (IV) indicates that the slope of the line C–D falls within a range of from 0.6 (Pa/sec$^{-1}$) to 1 (Pa/sec$^{-1}$).

$$\frac{\log \sigma_{\gamma=4\times10^4} - \log \sigma_{\gamma=3\times10^4}}{\log(4\times10^4) - \log(3\times10^4)} \quad \text{(IV-1)}$$

$$C(\log(3\times10^4), \log \sigma_{\gamma=3\times10^4}) \quad \text{(IV-2)}$$
$$D(\log(4\times10^4), \log \sigma_{\gamma=4\times10^4})$$

More preferably, the third ink set of the invention is an ink jet recording ink set having a plurality of ink compositions containing at least a colorant, a water-soluble organic solvent and water, wherein the flowing characteristics of each of the plurality of ink compositions at 20° C. are set to satisfy the below-described expression (V):

$$0.8 \leq \frac{\log \sigma_{\gamma=4\times10^4} - \log \sigma_{\gamma=3\times10^4}}{\log(4\times10^4) - \log(3\times10^4)} \leq 1 \quad \text{(V)}$$

wherein $\sigma_{\gamma=3\times10^4}$: shear stress (Pa) when the shear rate of the ink is $3\times10^4$ (sec$^{-1}$), and $\sigma_{\gamma=4\times10^4}$: shear stress (Pa) when the shear rate of the ink is $4\times10^4$ (sec$^{-1}$).

The below-described expression (V-1) in the expression (V) is a slope of the line C–D in FIG. 2 when the points C and D are determined as described in the expression (IV). The expression (V) indicates that the slope of the line C–D ranges from 0.8 (Pa/sec$^{-1}$) to 1 (Pa/sec$^{-1}$)

$$\frac{\log \sigma_{\gamma=4\times10^4} - \log \sigma_{\gamma=3\times10^4}}{\log(4\times10^4) - \log(3\times10^4)} \quad \text{(V-1)}$$

Here, the flowing characteristics (relation between shear rate and shear stress) of the ink composition at 20° C. is measured using a high shear capillary viscometer. The shear rate to be paid attention in the third ink set of the invention ranges from $3\times10^4$ (sec$^{-1}$) to $4\times10^4$ (sec$^{-1}$). As the example of such a viscometer, "High Shear Capillary Viscometer HVA6" manufactured by Anton Paar can be mentioned.

It is particularly preferred that the third ink set of the invention is an ink jet recording ink set having a plurality of ink compositions containing at least a colorant, a water-soluble organic solvent and water, wherein the flowing characteristics of each of the plurality of ink compositions at 20° C. are set to satisfy the below-described expression (VI):

$$0.9 \leq \frac{\log \sigma_{\gamma=4\times10^4} - \log \sigma_{\gamma=3\times10^4}}{\log(4\times10^4) - \log(3\times10^4)} \leq 1 \quad \text{(VI)}$$

wherein $\sigma_{\gamma=3\times10^4}$: shear stress (Pa) when the shear rate of the ink is $3\times10^4$ (sec$^{-1}$), and $\sigma_{\gamma=4\times10^4}$: shear stress (Pa) when the shear rate of the ink is $4\times10^4$ (sec$^{-1}$).

The below-described expression (VI-1) in the expression (VI) is a slope of the line C–D in FIG. 2 when the points C and D are determined as described in the expression (IV). The expression (VI) indicates that the slope of the line C–D ranges from 0.9 (Pa/sec$^{-1}$) to 1 (Pa/sec$^{-1}$).

$$\frac{\log \sigma_{\gamma=4\times10^4} - \log \sigma_{\gamma=3\times10^4}}{\log(4\times10^4) - \log(3\times10^4)} \quad \text{(VI-1)}$$

In the third ink set of the invention, the shear rate to be paid attention ranges from 3×10$^4$ (sec$^{-1}$) to 4×10$^4$ (sec$^{-1}$) in the above-described expressions (IV), (V) and (VI).

The slope of the line C–D in FIG. 2 can be determined by measuring the shear stresses at the shear rates of 3×10$^4$ (sec$^{-1}$) and 4×10$^4$ (sec$^{-1}$), respectively.

<Fourth Ink Set According to the Invention>

The fourth ink set of the invention is an ink jet recording ink set having a plurality of ink compositions each containing at least a colorant, a water-soluble organic solvent and water, wherein the dynamic viscoelasticity of each of the plurality of ink compositions at 20° C. is set to satisfy the below-described expression (VII):

$$1.2 \leq \frac{\log G'_{\omega=0.8} - \log G'_{\omega=0.6}}{\log 0.8 - \log 0.6} \leq 2 \quad \text{(VII)}$$

wherein $G'_{\omega=0.6}$: storage shear modulus (Pa) when frequency (ω) applied to the ink composition is 0.6 rad/s, and, $G'_{\omega=0.8}$: storage shear modulus (Pa) when frequency (ω) applied to the ink composition is 0.8 rad/s.

First, the above-described expression (VII) will be described specifically with reference to FIG. 3.

FIG. 3 is a schematic view of the dynamic viscoelasticity curve of the ink composition at 20° C., with the common logarithm of applied frequency ω (rad/sec) and the common logarithm of a storage shear modulus G' (Pa) plotted on the abscissa and ordinate, respectively.

As described above, when the applied frequency and storage shear modulus are plotted by log—log scale, a Newtonian fluid shows a straight line with a slope of 2 (Pa·sec/rad). An ink composition containing, as a colorant, a pigment or a water-insoluble or water-sparingly-soluble dye in the form of particles tends to be a non-Newtonian fluid. In this case, the graph draws a curve, which is presumed to owe to the interaction between colorant particles in the ink composition.

The below-described expression (VII-1) in the expression (VII) is a slope of the line E–F in FIG. 3 when the points E and F are determined as described in the expression (VII-2). The expression (VII) indicates that the slope of the line E–F ranges from 1.2 (Pa·sec/rad) to 2 (Pa·sec/rad).

$$\frac{\log G'_{\omega=0.8} - \log G'_{\omega=0.6}}{\log 0.8 - \log 0.6} \quad \text{(VII-1)}$$

$$E(\log 0.6, \log G'_{\omega=0.6}) \quad \text{(VII-2)}$$
$$F(\log 0.8, \log G'_{\omega=0.8})$$

More preferably, the fourth ink set of the invention is an ink jet recording ink set having a plurality of ink compositions containing at least a colorant, a water-soluble organic solvent and water, wherein the dynamic viscoelasticity of each of the plurality of ink compositions at 20° C. is set to satisfy the below-described expression (VIII):

$$1.6 \leq \frac{\log G'_{\omega=0.8} - \log G'_{\omega=0.6}}{\log 0.8 - \log 0.6} \leq 2 \quad \text{(VIII)}$$

wherein $G'_{\omega=0.6}$: storage shear modulus (Pa) when frequency (ω) applied to the ink composition is 0.6 rad/s, and, $G'_{\omega=0.8}$: storage shear modulus (Pa) when frequency (ω) applied to the ink composition is 0.8 rad/s.

The below-described expression (VIII-1) in the expression (VIII) is a slope of the line E–F in FIG. 3 when the points E and F are determined as described in the expression (VII). The expression (VIII) indicates that the slope of the line E–F ranges from 1.6 (Pa·sec/rad) to 2 (Pa·sec/rad).

$$\frac{\log G'_{\omega=0.8} - \log G'_{\omega=0.6}}{\log 0.8 - \log 0.6} \quad \text{(VIII-1)}$$

It is especially preferred that the fourth ink set of the invention is an ink jet recording ink set having a plurality of ink compositions containing at least a colorant, a water-soluble organic solvent and water, wherein the dynamic viscoelasticity of each of the plurality of ink compositions at 20° C. is set to satisfy the below-described expression (IX):

$$1.8 \leq \frac{\log G'_{\omega=0.8} - \log G'_{\omega=0.6}}{\log 0.8 - \log 0.6} \leq 2 \quad \text{(IX)}$$

wherein $G'_{\omega=0.6}$: storage shear modulus (Pa) when frequency (ω) applied to the ink composition is 0.6 rad/s, and, $G'_{\omega=0.8}$: storage shear modulus (Pa) when frequency (ω) applied to the ink composition is 0.8 rad/s.

The below-described expression (IX-1) in the expression (IX) is a slope of the line E–F in FIG. 3 when the points E and F are determined as described in the expression (VII). The expression (IX) indicates that the slope of the line E–F ranges from 1.8 (Pa·sec/rad) to 2 (Pa·sec/rad).

$$\frac{\log G'_{\omega=0.8} - \log G'_{\omega=0.6}}{\log 0.8 - \log 0.6} \quad \text{(IX-1)}$$

Such an ink composition is available by measuring its dynamic viscoelasticity by using, for example, a viscoelastometer 1 as illustrated in FIG. 4.

Described specifically, the viscoelastometer 1 is equipped with an accurate measuring tube 5 having a radius a and length L, which contains a test liquid 2, is communicated with a test liquid reservoir 3 and is surrounded by a thermostat 4. To the test liquid 2 in the tube 5, vibration is applied via a thin film 6 at a frequency of ω by a vibrator not illustrated. Pressure P applied to the test liquid 2 which is oscillated and fluidized by this vibration and volume fluidity U are measured by sensor means 7. The shear stress at the wall of the accurate measuring tube is proportional to the pressure P, while the shear strain γ and shear rate γ· are proportionate to the volume fluidity U. Accordingly, the shear stress τ, shear strain γ and shear rate γ· of the test liquid can be calculated from the pressure P and volume fluidity U.

Shear stress: τ~P(a/2L)

Shear rate: γ·~U(4πa$^3$)

Shear strain: γ=γ·/2πω

(in the expression, a stands for the radius of the measuring tube, L means the height of the measuring tube and ω stands for frequency).

From these calculated values, viscosity and elasticity (or storage and loss shear modulus) of the ink composition at each applied frequency ω can be determined.

During the measurement, it is only necessary to maintain the shear strain at a constant value, typically within a range of about 0.1 to 10, preferably within a range of about 0.1 to 5. When the shear strain is maintained at a constant value within the above-described range, the dynamic viscoelasticity due to shear strain comes to have linearity. Then, owing to this linearity, it is possible to known only the dependence of the viscoelasticity functions (G', G", η', η", tan δ) on frequency.

When the ink composition of the fourth ink set of the invention is prepared, the applied frequency is changed while the shear strain is maintained constant upon measuring the dynamic viscoelasticity of the ink composition at the applied frequency (ω). At this time, the applied frequency (ω) is changed within a range of about 0.01 to 10 rad/sec, preferably about 0.1 to 10 rad/sec.

When the dynamic viscoelasticity of the ink composition is measured by changing the applied frequency (ω) within the above-described range (low frequency) and the relation between the storage shear modulus (G') of the ink composition, which has been calculated from the dynamic viscoelasticity thus measured, and applied frequency (ω) is drawn on two-dimensional coordinate axes, the slope tends to be flat as shown in FIG. 3 in the case where interaction exists between colorant particles, from which the state of the ink composition can be determined.

Alternatively, the dynamic viscoelasticity of the ink composition can be measured using a cone-disc type viscoelastometer. The ink composition is filled in a space between the cone and the disc disposed horizontally parallel each other so as to place their centers on the same vertical axis and a torque generated by repeated movements of the disc or cone plate at a predetermined swing angle and a predetermined applied frequency is detected. Then, the shear stress τ and shear rate γ can be calculated in accordance with the following expressions.

Shear stress: $\tau = 3M/(2\pi R^3)$

Shear rate: $\gamma' = \Omega/\theta$ (wherein M stands for torque; R, radius of the disc; Ω, angular velocity; and θ, cone angle)

From the values thus calculated, the storage shear modulus and loss shear modulus at the applied frequency (ω) can be determined.

As the above-described viscoelastomer, a commercially available one can be used. For example, "PHYSICA MCR300" manufactured by Paar Physica is usable. Measurement is conducted while controlling the stress, and within a range of viscoelasticity showing a linearity, dependency of the dynamic viscoelasticity functions (G', G", η', η", tan δ) on frequency is determined.

In the ink composition to be incorporated in the fourth ink set of the invention, no particular limitation is imposed on the viscoelastometer insofar as it does not depart from the above-described principle. A commercially available viscoelastometer is usable. Examples of the cone-disc type viscoelastometer usable in the invention include "PHYSICA MCR300" manufactured by Paar Physica, while those of the capillary type viscoelastometer include "VILASTICV-E SYSTEM" manufactured by VILASTIC SCIENTIFIC and "DCR" manufactured by Paar Physica.

The technical features of the first to fourth ink sets of the invention were so far described. The flowing characteristics or dynamic viscoelasticity of each of the plurality of the ink compositions at 20° C. can be adjusted within the above-described ranges by controlling the kinds or component ratios of the constituents of the ink composition as needed.

<Embodiments of the Ink Set of the Invention>

The embodiment common to the first to fourth ink sets of the invention will next be described.

The ink set of the invention has, as described above, a plurality of ink compositions containing at least a colorant, a water-soluble organic solvent and water.

First, the colorant of the ink composition will be described in detail.

Examples of the colorant include pigments such as inorganic and organic pigments, and water-insoluble or water-sparingly-soluble dyes such as disperse dyes and oil soluble dyes, each capable of developing a desired color. As the inorganic pigment, titanium oxide, iron oxide and carbon blacks are usable. Examples of the organic pigment usable here include azo pigments (such as azo lake, insoluble azo pigment, condensed azo pigment and chelate azo pigment), polycyclic pigments (such as phthalocyanine pigment, perylene pigment, perinone pigment, anthraquinone pigment, quinacridone pigment, dioxane pigment, thioindigo pigment, isoindolinone pigment and quinophlanone pigment), nitro pigments, nitroso pigments and aniline black. More specifically, examples of the pigment usable for a black ink include the below-exemplified carbon blacks such as No. 2300, No. 900, MCF88, No. 33, No. 40, No. 45, No. 52, MA7, MA8, MA100 and No2200B, each produced by Mitsubishi Chemical; Raven 5750, Raven 5250, Raven 5000, Raven 3500, Raven 1255 and Raven 700, each produced by Columbia; Regal 400R, Regal 330R, Rega 1660R, Mogul L. Monarch 700, Monarch 800, Monarch 880, Monarch 900, Monarch 1000, Monarch 1100, Monarch 1300 and Monarch 1400, each produced by Cabott Co.; and Color Black FW1, Color Black FW2, Color Black FW2V, Color Black FW18, Color Black FW200, Color Black S150, Color Black 160, Color Black S170, Printex 35, Printex U, Printex V, Printex 140U, Special Black 6, Special Black 5, Special Black 4aA and Special Black 4, each produced by Degussa. Specific examples of the pigment usable for a yellow ink include C.I. pigment Yellow 1, C.I. pigment Yellow 2, C.I. pigment Yellow 3, C.I. pigment Yellow 12, C.I. pigment Yellow 13, C.I. pigment Yellow 14, C.I. pigment Yellow 16, C.I. pigment Yellow 17, C.I. pigment Yellow 73, C.I. pigment Yellow 74, C. I. pigment Yellow 75, C. I. pigment Yellow 83, C.I. pigment Yellow 93, C.I. pigment Yellow 95, C.I. pigment Yellow 97, C.I. pigment Yellow 98, C.I. pigment Yellow 114, C.I. pigment Yellow 128, C.I. pigment Yellow 129, C.I. pigment Yellow 151 and C.I. pigment Yellow 154. Specific examples of the pigment usable for a magenta ink include C.I. pigment Red 5, C.I. pigment Red 7, C.I. pigment Red 12, C.I. pigment Red 48(Ca), C.I. pigment Red 48(Mn), C.I. pigment Red 57(Ca), C.I. pigment Red 57:1, C.I. pigment Red 112, C.I. pigment Red 123, C.I. pigment Red 168, C.I. pigment Red 184 and C.I. pigment Red 202. Specific examples of the pigment usable for a cyan ink include C.I. pigment Blue 1, C.I. pigment Blue 2, C.I. pigment Blue 3, C.I. pigment Blue 15, C.I. pigment Blue 15:3, C.I. pigment Blue 15:34, C.I. pigment Blue 16, C.I. pigment Blue 22, C.I. pigment Blue 60, C.I. Vat Blue 4, and C.I. Vat Blue 60. Pigments usable here are not limited thereto.

The content of the pigment in the ink composition preferably ranges from 0.1 to 25 wt. %, more preferably 0.5 to 10 wt. %.

Examples of the water-insoluble or water-sparingly-soluble dye include disperse dyes, oil-soluble dyes, dye chelates (basic dye chelate and acid dye chelate).

The content of the water-insoluble or water-sparingly-soluble dye preferably ranges from 0.1 to 25 wt. %, more preferably 0.5 to 10 wt. %.

Secondly, preferred as the colorant are self-dispersion type pigments having a hydrophilized surface because they have at least one functional group selected from carbonyl, carboxyl, hydroxyl, sulfone and sulfonic acid groups and salts thereof. Such self-dispersion type pigments can be dispersed in water without a dispersant.

The self-dispersion type pigments are stable when used in combination with an acetylene glycol compound of the formula (6) serving as a nonionic surfactant which will be described later, or a glycol ether such as propylene glycol monobutyl ether, dipropylene glycol monobutyl ether, diethylene glycol monobutyl ether or triethylene glycol monobutyl ether.

Such self-dispersion type pigments can be obtained, for example, by introducing a hydrophilic functional group or a molecule containing the hydrophilic functional group to the surface of the pigment by physical treatment such as vacuum plasma or chemical treatment by oxidation treatment with hypochlorous acid or sulfonic acid. More specifically, the oxidation treatment to introduce a carboxyl group or a hydroxyl group is conducted by liquid-phase or gas-phase oxidation treatment with an oxidizing agent such as ozone, nitric acid, hydrogen peroxide, hypohalogenic acid, nitrogen oxide or fluorine gas. The sulfonating treatment is, on the other hand, conducted using a sulfonating agent such as sulfuric acid, fuming nitric acid, sulfonated pyridinic acid, sulfamic acid, sulfur trioxide, chlorosulfuric acid or amidosulfuric acid. These oxidizing agents or sulfonating agents may be used either singly or in combination.

In the invention, single or plural kinds of functional groups may be introduced to the surface of the pigment particles. The kind or amount of the functional group to be introduced is determined as needed in consideration of the dispersion stability of the thus-treated pigment in the ink composition, color density or the like. The above-described self-dispersion type pigment is available, for example, by the process as described in JP-A-8-3498. The self-dispersion type pigment of carbon black obtained by the above-described process exhibits a surface active hydrogen content as high as 1.5 to 2.5 mmol/g.

Thirdly, a micro-encapsulated pigment can be mentioned as the colorant. In the ink set of the invention, use of this micro-encapsulated pigment is especially preferred.

This micro-encapsulated pigment can be prepared by a known physical mechanical method or chemical method. More specifically, usable is the phase separation method (coacervation), in-water-drying method (interface precipitation method), spray drying method, pan coating method, in-water-curing-and-coating method, interface polymerization method, in situ method and ultrasonic wave method without limitation. As the micro-encapsulated pigment, an anionic micro-encapsulated pigment as described in JP-A-9-151342 can be used in the invention. The micro-encapsulated pigment to be used in the invention is also available by the method as described in JP-A-10-316909.

The micro-encapsulated pigment is preferably coated with a polymer compound.

Preferred polymer compounds each mainly comprises at least one of vinyl polymer, poly(meth)acrylate, styrene-(meth)acrylic acid copolymer, polyester, polyamide, polyimide, polyurethane, amino polymer, silicon-containing polymer, sulfur-containing polymer, fluorine-containing polymer and epoxy resin.

High molecular compounds having a crosslinked structure obtained by enclosing a pigment with an organic phase containing at least a polymer compound having both a crosslinkable group and a hydrophilic group and a crosslinking agent and then carrying out crosslinking reaction are also preferred as the above-described polymer.

High molecular compounds obtained by polymerizing a polymerizable surfactant having a polymerizable group, a hydrophobic group and a hydrophilic group with a monomer are also preferred. As the above-described polymerizable group, unsaturated hydrocarbon groups are preferred. Examples include vinyl, allyl, acryloyl, methacryloyl, propenyl, vinylidene and vinylene groups. At least one of these groups are usable here. As the above-described hydrophilic group, at least one of sulfone, sulfonic acid, carboxyl, carbonyl and hydroxyl groups and salts thereof is preferred. As the above-described monomer, that containing a crosslinking monomer is preferred.

In the invention, a micro-encapsulated pigment obtained by coating the below-described pigment with the below-described polymer compound and having the below-described average particle size is preferred.

Examples of such pigment include carbon black for a black ink, C.I. pigment Blue 15:1, C.I Pigment Blue 15:3 or C.I. pigment Blue 15:4 for a cyan ink, C.I. pigment Red 122, C.I. pigment Red 146, C.I. pigment Red 169, C.I. pigment Red 81:2, C.I. pigment Red 176, C.I. pigment Red 184, C.I. pigment Red 185, C.I. pigment Red 202, C.I. pigment Red 208, C.I. pigment Red 57:1, C.I. pigment Violet 32 or C.I. pigment Violet 19 for a magenta ink, C.I. pigment Yellow 73, C.I. pigment Yellow 109, C.I. pigment Yellow 110, C.I. pigment Yellow 128, C.I. pigment Yellow 129, C.I. pigment Yellow 138, C.I. pigment Yellow 150, C. I. pigment Yellow 151, C. I. pigment Yellow 154, C.I. pigment Yellow 155, C.I. pigment Yellow 180 and C.I. pigment Yellow 185 for a yellow ink. At least one selected from each of the above-exemplified groups is preferably employed.

The polymer compound is selected from a group consisting of vinyl-based polymer compounds, polyesters, polyamides, polyimides, polyurethanes, amino-based polymer compounds, silicon-containing polymers, sulfur-containing polymers, fluorine-containing polymers and epoxy resins. Examples of the vinyl-based polymer compounds include poly(meth)acrylate, styrene-(meth)acrylic acid copolymer, styrene-(meth)acrylate copolymer, styrene-(meth)acrylate-(meth)acrylic acid copolymer, styrene-maleic acid copolymer, styrene-maleate-maleic acid copolymer, styrene-itaconic acid copolymer, styrene-itaconate-itaconic acid copolymer, styrene-(meth)acrylate-itaconic acid copolymer, styrene-fumaric acid copolymer and styrene-fumarate-fumaric acid copolymer.

The micro-encapsulated pigment obtained by coating the pigment with the polymer compound preferably has an average particle size of 400 nm or less, more preferably 200 nm or less.

Any micro-encapsulated pigment is usable insofar as it is prepared in the above-described process. Particularly preferred is a process for coating a pigment with a polymer compound by emulsion polymerization using a polymerizable surfactant. For example, preferred is the use, as a micro-encapsulated pigment, of an aqueous dispersion of the pigment available by the process as disclosed in JP-A-5-320276 or JP-A-10-316909. Employment of this process facilitates adjustment of the flowing characteristics and dynamic viscoelasticity of the ink composition at 20° C. to satisfy the above-specified flowing characteristics in the first to third ink sets, and the above-specified dynamic viscoelasticity in the fourth ink set.

The term "aqueous dispersion of the pigment" as used here means fine and stable encapsulated particles of the pigment obtained by enclosing the pigment with a polymer of a polymerizable surfactant having both anionic and nonionic hydrophilic groups and a monomer. In the "aqueous dispersion of the pigment", the fine and stable encapsulated particles of the pigment have been dispersed stably in an aqueous medium. The polymerizable surfactant having both anionic and nonionic hydrophilic groups facilitates the formation of encapsulated particles because it adsorbs to the surface of the pigment particles and has excellent dispersion stability (having an ability of preventing agglomeration of particles) even under the subsequent polymerization conditions.

As the polymerizable surfactant which is to be used for the aqueous dispersion of the pigment and has both anionic and nonionic hydrophilic groups, compounds represented by the below-described formula (1) are preferred. The polymerizable surfactants represented by the below-described formula (1) are disclosed in JP-A-5-320276 and JP-A-10-316909.

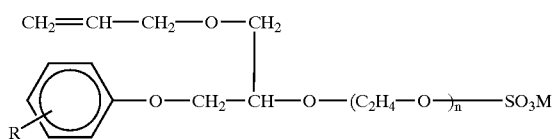

(1)

By adjusting the values of R and n in the above-described formula (1), the polymerizable surfactant suited to the hydrophilic degree or hydrophobic degree on the surface of the pigment can be prepared. Compounds represented by the below-described formulas (2) to (5) are specific preferred examples of the polymerizable surfactant represented by the formula (1). They may be used either singly or in combination. The polymerizable surfactant can be provided as a homopolymer, but a copolymer is preferred.

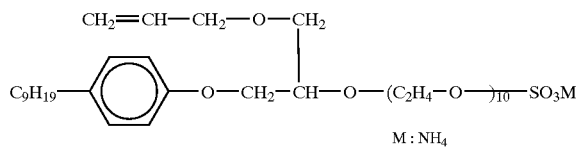

(2)

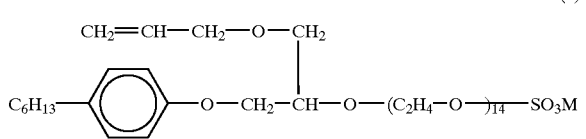

(3)

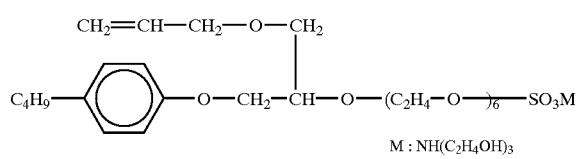

(4)

-continued

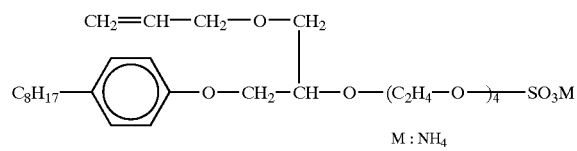

(5)

The polymerizable surfactant is preferably added in an amount ranging from about 10 to 150 wt. %, more preferably from about 20 to 100 wt. %, based on the pigment. Amounts of 10 wt. % or greater make it possible to improve the dispersion stability of the ink composition. Amounts not greater than 150 wt. % make it possible to suppress remaining of the polymerizable surfactant not adsorbed to the pigment and prevent formation of a polymer other than capsule particles, resulting in an improvement of the jetting stability of the ink composition.

Any monomer is usable in combination with the polymerizable surfactant insofar as it is highly copolymerizable with the polymerizable surfactant. The polymerizable surfactant represented by the formula (1) has a high electron donating property so that a monomer having a high electron accepting property is preferred. Specific examples of the monomer having a high electron accepting property include acrylonitrile, fumaronitrile, fumaric acid diester such as dibutyl fumarate, maleic acid diesters such as dibutyl maleate; maleimides such as N-phenylmaleimide; and vinylidene cyanide. They may be used either singly or in combination.

The monomer is preferably added in an amount ranging from about 2 to 15 molar ratios, more preferably about 3 to 12 molar ratios, relative to the polymerizable surfactant. By the addition in an amount of 2 molar ratios or greater, the dispersion stability of the encapsulated pigment particles in an aqueous medium becomes excellent. Amounts not greater than 15 molar ratios, on the other hand, make it possible to sufficiently dissolve the monomer in the adsorption layer of the polymerizable surfactant, thereby suppressing the generation of a water-insoluble polymer or suppressing a relative decrease in the amount of an ionic repulsive group, leading to heightening of the dispersion stability of the ink composition.

Examples of a polymerization initiator usable here include potassium persulfate, ammonium persulfate, sodium persulfate, 2,2-azobis-(2-methylpropioneamidine) dihydrochloride and 4,4-azobis-(4-cyanovaleric acid).

Such a micro-encapsulated pigment is available by the below-described process. In a reaction vessel equipped with an ultrasonic generator, stirrer and a temperature controller, a pigment, a polymerizable surfactant having, in the molecule thereof, a radical polymerizable double bond (the polymerizable surfactant as described in JP-B-49-46291, JP-B-1-24142, JP-A-62-104802, JP-A-62-221431, JP-A-62-34974, JP-A-55-11525, JP-B-46-34898 or JP-A-51-30284) and water are charged. The mixture is exposed to ultrasonic wave for a predetermined time, followed by pulverization. In this step, ordinarily employed dispersing machine such as ball mill, roll mill or Eiger mill can be used instead of the ultrasonic generator. A copolymerizable monomer having, in the molecule thereof, a radical polymerizable double bond and a water-soluble polymerization initiator such as potassium persulfate or ammonium persulfate are added and then, the mixture is polymerized at a predetermined polymerization temperature. It is presumed that in the micro-encapsulated pigment thus obtained, the pigment particles have been coated completely with the polymer compound (have no coating-free portion) and at the same time, hydrophilic groups in the structure of the polymer compound have been oriented regularly on the surface of the particles toward the water phase. The micro-encapsulated pigment therefore has high dispersion stability. Use of such a micro-encapsulated pigment facilitates adjustment of the flowing characteristics and dynamic viscoelasticity of the ink composition at 20° C. to satisfy the above-specified flowing characteristics of the first to third ink sets and above-specified dynamic viscoelasticity of the fourth ink set, respectively.

Alternatively, a micro-encapsulated pigment coated with a polymer compound having a crosslinked structure which compound has been obtained by enclosing a coloring material with an organic phase at least containing the above-described polymer compound having both a crosslinking-reactive group and a hydrophilic group and a crosslinking agent and then causing a crosslinking reaction. Such a micro-encapsulated pigment is available by using the polymer compound having both a crosslinking-reactive group and a hydrophilic group and conducting phase reversal emulsification, thereby coating the former with the latter and then carrying out crosslinking reaction with the crosslinking agent. Described specifically, the coloring material, the polymer compound having both a crosslinking-reactive group and a hydrophilic group and the crosslinking agent are added to an organic solvent. To the resulting solution or dispersion, a neutralizing agent and, if necessary, a surfactant (preferably, reactive surfactant) are added. The resulting mixture is used as an organic solvent phase. Water is charged in the organic solvent phase or the organic solvent phase is charged in water while stirring either one of the organic solvent phase or water, thereby causing phase reversal emulsification, whereby the coloring material is enclosed with the organic phase comprising the polymer compound having both a crosslinking-reactive group and a hydrophilic group and the crosslinking agent. Although a catalyst for causing crosslinking reaction may be added in either one of the organic solvent phase or water phase, it is preferred to add an oil-soluble catalyst to the organic solvent phase, and a water-soluble catalyst to the water phase. After crosslinking reaction at a predetermined temperature to cause crosslinking reaction for a predetermined time, the organic solvent is distilled off in a conventional manner such as distillation or distillation under reduced pressure, whereby a dispersion having, dispersed in the water phase thereof, the colorant obtained by enclosing the coloring material with the crosslinked-structure-having polymer compound can be obtained.

The hydrophilic group of the polymer compound is selected from sulfone, sulfonic acid and carboxylic groups, and salts thereof. The crosslinking-reactive group of the polymer compound is selected from glycidyl, isocyanate, hydroxyl and carboxyl groups and unsaturated hydrocarbon groups. The unsaturated hydrocarbon group is selected from vinyl, allyl, acryloyl, methacryloyl, propenyl, vinylidene and vinylene groups.

In a preferred embodiment, a vinyl-based polymer compound, poly(meth)acrylate or styrene-(meth)acrylic acid copolymer is employed as the polymer compound. Such a polymer compound is available by solution polymerization, in a solvent such as an aliphatic hydrocarbon solvent, aromatic hydrocarbon solvent, ester solvent, ketone solvent, alcohol solvent or aprotic solvent, of a (meth)acrylate monomer having at least one hydrophilic group selected from the class consisting of sulfone, sulfonic acid and carboxyl groups, and salts thereof, a (meth)acrylate monomer having a crosslinking-reactive group such as glycidyl or isocyanate group, and a monomer copolymerizable therewith in the presence of a polymerization initiator, for example, a peroxide such as t-butyl peroxybenzoate, di-t-butyl peroxide, cumene perhydroxide, acetyl peroxide, benzoyl peroxide or lauroyl peroxide, or an azo compound such as azobisisobutylonitrile, azobis-2,4-dimethylvaleronitrile or azobiscyclohexanecarbonitrile. Upon solution polymerization, a polymerization chain transfer agent may be added further.

Examples of the chain transfer agent include mercaptanes such as octylmercaptane, n-dodecylmercaptane, t-dodecylmercaptane, n-hexadecylmercaptane, n-tetradecylmercaptane and t-tetradecylmercaptane; xanthogen disulfides such as dimethylxanthogen sulfide, diethylxanthogen disulfide and diisopropylxanthogen disulfide; thiuram disulfides such as tetramethylthiuram disulfide, tetraethylthiuram disulfide and tetrabutylthiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, $\alpha$-terpinene, $\gamma$-terpinene, dipentene, $\alpha$-methylstyrene dimer (preferably, that containing 2,4-diphenyl-4-methyl-1-pentene in an amount of 50 parts by weight or greater), 9,10-dihydroanthracene, 1,4-dihydronaphthalene, indene and 1,4-cyclohexadiene; and unsaturated heterocyclic compounds such as xanthene and 2,5-dihydrofuran. They may be used either singly or in combination.

Polymerization is usually conducted at 30 to 100° C., preferably 50 to 80° C. for 1 to 10 hours, which is however selected as needed, depending on the nature of the radical polymerization initiator, monomer, or solvent to be employed. Polymerization is preferably conducted in an inert gas atmosphere such as nitrogen. After polymerization, the resulting copolymer can be isolated from the reaction mixture in a known manner such as reprecipitation or removal of the solvent by distillation. The copolymer thus obtained can be purified by removing the unreacted monomer and the like by re-precipitation, membrane separation, chromatography or extraction. The polymer compound thus obtained has preferably a weight-average molecular weight of 1000 to 50000, more preferably 1000 to 30000 from the viewpoints of the ease in enclosing the coloring material and crosslinking.

Examples of the (meth) acrylate monomer having a hydrophilic group include acrylic monomers having a carboxyl group such as acrylic acid, methacrylic acid, crotonic acid, propylacrylic acid, isopropylacrylic acid, itaconic acid and fumaric acid, with acrylic acid and methacrylic acid being preferred; (meth) acrylic monomers having a sulfonic acid group such as sulfoethyl methacrylate and butylacrylamide sulfonic acid; and (meth) acrylic acid monomers having a phosphone group such as phosphoethyl methacrylate.

Examples of the (meth)acrylate monomer having a crosslinking-reactive group include block-isocyanate-group-containing polymerizable monomers, epoxy-group-containing monomers, and monomers containing a 1,3-dioxolan-2-on-4-yl group. The block-isocyanate-group-containing polymerizable monomers are easily available, for example, by addition reaction of a known blocking agent to an isocyanate-group-containing polymerizable monomer such as 2-methacryloyloxyethyl isocyanate. It is also available by the addition reaction of a compound having an isocyanate group and a block isocyanate group to a vinyl copolymer having a hydroxyl group and a carboxyl group. Examples of the epoxy-group-containing monomer include glycidyl (meth)acrylate, and alicyclic-epoxy-group-containing (meth)acrylate monomers. Examples of the monomer containing a 1,3-dioxolan-2-on-4-yl group include 1,3-dioxolan-2-on-4-ylmethyl (methacrylate) and 1,3-dioxolan-2-on-4-ylmethyl vinyl ether.

Examples of the monomer copolymerizable with the above-described monomers include (meth)acrylates such as methyl acrylate, ethyl acrylate, isopropyl acrylate, n-propyl acrylate, n-butyl acrylate, t-butyl acrylate, 2-ethylhexyl acrylate, n-octyl acrylate, lauryl acrylate, benzyl acrylate, methyl methacrylate, ethyl methacrylate, isopropyl methacrylate, n-propyl methacrylate, n-butyl methacrylate, isobutyl methacrylate, t-butyl methacrylate, 2-ethylhexyl methacrylate, n-octyl methacrylate, lauryl methacrylate, stearyl methacrylate, tridecyl methacrylate and benzyl methacrylate; addition reaction products of a fatty acid and a (meth)acrylate monomer having an oxirane structure such as an addition reaction product of stearic acid and glycidyl methacrylate; addition reaction products of an oxirane compound having an alkyl group having at least 3 carbon atoms and (meth)acrylic acid; styrene monomers such as styrene, α-methylstyrene, o-methylstyrene, m-methylstyrene, p-methylstyrene and p-tert-butylstyrene; itaconates such as benzyl itaconate and ethyl itaconate; maleates such as dimethyl maleate and diethyl maleate; fumarates such as dimethyl fumarate and diethyl fumarate; and acrylonitrile, methacrylonitrile, vinyl acetate, isobornyl acrylate, isobornyl methacrylate, aminoethyl acrylate, amonopropyl acrylate, methylaminoethyl acrylate, methylaminopropyl acrylate, ethylaminoethyl acrylate, ethylaminopropyl acrylate, acrylic aminoethylamide, acrylic aminopropylamide, acrylic methylaminoethylamide, acrylic methylaminopropylamide, acrylic ethylaminoethylamide, acrylic ethylaminopropylamide, methacrylic amide, aminoethyl methacrylate, aminopropyl methacrylate, methylaminoethyl methacrylate, methylaminopropyl methacrylate, ethylaminoethyl methacrylate, ethylaminopropyl methacrylate, methacrylic aminoethylamide, methacrylic aminopropylamide, methacrylic methylaminoethylamide, methacrylic methylaminopropylamide, methacrylic ethylaminoethylamide, methacrylic ethylaminopropylamide, hydroxymethyl acrylate, 2-hydroxyethyl methacrylate, 2-hydroxypropyl acrylate, hydroxyethyl methacrylate, 2-hydroxyethyl methacrylate, 2-hydroxypropyl methacrylate, N-methylol acrylamide and allyl alcohol.

As the crosslinking agent, employed are those serving to cause crosslinking reaction between the above-described polymer compound and crosslinking reactive group and having, in their molecule, at least two functional groups reactive with the crosslinking reactive group of the polymer compound. For the polymer compound having a glycidyl group as a crosslinking reactive group, use of a compound, as the crosslinking agent, having two or more functional groups of at least one kind selected from amino, carboxyl, hydroxyl, N-methylol and N-methylolether groups is preferred. Examples of such a compound include aliphatic amines such as ethyleneamines, N-aminoethylpiperazine, metaxylenediamine, 1,3-bis(aminomethyl)cyclohexane and polyamides; alicyclic amines such as para-menthanediamine, mesophoronediamine, bis(4-amino-3-methylcyclohexyl)methane and 2-ethyl-4-methylimidazole; aromatic amines such as metaphenylenediamine, 4,4'-diaminodiphenylamine, 4,4'-diaminodiphenylsulfone and dicyandiamide; and acid anhydrides such as phthalic anhydride, pyromellitic anhydride and nadic anhydride.

For the polymer compound having an isocyanate group as the crosslinking reactive group, use of a compound having two or more functional groups of at least one kind selected from carboxyl, hydroxyl, amino and mercapto groups is preferred. Examples include polyols such as polyether polyols, polytetramethylene ether glycol, alkylene-oxide copolymerized polyols, epoxy-resin-modified polyols, lactone-based polyester polyols, condensed polyester polyols, polycarbonate diols, acrylic polyols, polybutadiene polyols, phosphorous-containing polyols and halogen-containing polyols; polyamines such as polyether polyamines, polytetramethylene ether diamine, alkylene-oxide-copolymerized polyamines, epoxy-modified polyamines, condensed polyester polyamines, polycarbonate polyamines and acrylic polyamines; polythiols such as polyether polythiols, polytetramethylene ether dithiols, alkylene-oxide-copolymerized polythiols, epoxy-resin-modified polythiols, lactone-based polyester polythiols, condensed polyester polythiols, polycarbonate dithiols, acrylic polythiols, polybutadiene polythiols, phosphorous-containing polythiols, and halogen-containing polythiols.

For the polymer compound having a hydroxyl group as a crosslinking reactive group, use of a compound having two or more functional groups of at least one kind selected from glycidyl and isocyanate groups is preferred.

For the polymer compound having an unsaturated hydrocarbon group as a crosslinking reactive group, use of a compound having two or more unsaturated hydrocarbon groups of at least one kind selected from vinyl, allyl, acryloyl, methacryloyl, propenyl, vinylidene and vinylene groups is preferred. Examples include ethylene glycol diacrylate, diethylene glycol diacrylate, triethylene glycol diacrylate, tetraethylene glycol diacrylate, polyethylene glycol diacrylate, allyl acrylate, bis(acryloxyethyl) hydroxyethyl isocyanurate, bis(acryloxyneopentyl glycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxy•diethoxy)phenyl]propane, 2,2-bis[4-(acryloxyethoxy•polyethoxy)phenyl]propane, hydroxypivalic acid neopentyl glycol diacrylate, 1,4-butanediol diacrylate, dicyclopentanyl diacrylate, dipentaerythritol hexaacrylate, dipentaerythritol monohydroxypentaacrylate, ditrimethylol propanetetraacrylate, pentaerythritol triacrylate, tetrabromo(bisphenol A) diacrylate, triglycerol diacrylate, trimethylol propane triacrylate, tris (acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl] propane, 2,2-bis[4-(methacryloxyethoxy)phenyl]propane, 2,2-bis[4-methacryloxyethoxydiethoxy)phenyl]propane, 2,2-bis[4-(methacryloxyethoxypolyethoxy)phenyl]propane, tetrabromo(bisphenol A) dimethacrylate, dicyclopentanyl dimethacrylate, dipentaerythritol hexamethacrylate, glycerol dimethacrylate, hydroxypivalic acid neopentyl glycol dimethacrylate, dipentaerythritol monohydroxypentamethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate and diethylene glycol bisallylcarbonate.

The above-exemplified crosslinking agent is preferably added to an organic solvent phase in an amount ranging from 0.01 to 0.1 in terms of a weight ratio relative to the polymer compound having both a crosslinking reactive group and a hydrophilic group. Amounts less than 0.01 are not preferred because they cause an increase in a viscosity over time, clogging of a nozzle and inferior jetting stability. Amounts exceeding 0.1 are also not preferred because they cause deterioration in scratch resistance and increase in the particle size.

As a catalyst used for crosslinking reaction, any compound causing the reaction or having the reaction-promoting effect is usable. When the crosslinking reactive group of the polymer compound is an unsaturated hydrocarbon group and the crosslinking agent is a compound having two or more unsaturated hydrocarbon groups of at least one kind selected from vinyl, allyl, acryloyl, methacryloyl, propenyl, vinylidene and vinylene groups, either an oil-soluble radical polymerization initiator, for example, a peroxide such as t-butyl peroxybenzoate, di-t-butyl peroxide, cumene perhydroxide, acetyl peroxide, benzoyl peroxide or lauroyl peroxide or an azo compound such as azobisisobutyronitrile, azobis-2,4-dimethylvalelonitrile or azobiscyclohexanecarbonitrile; or a water-soluble radical polymerization initiator, for example, potassium persulfate, ammonium persulfate or sodium persulfate is usable. The amount of the catalyst is determined as needed.

Although no particular limitation is imposed on an organic solvent to be used for the organic solvent phase, an organic solvent which can dissolve, therein, the above-described polymer compound having both a crosslinking reactive group and a hydrophilic group. In consideration of the ease of distilling-off of the organic solvent, low-boiling point organic solvents are preferred. Examples include ketone organic solvents such as acetone and methyl ethyl ketone, ester organic solvents such as ethyl acetate, alcohol organic solvents such as ethanol and isopropyl alcohol, and aromatic hydrocarbon organic solvents such as benzene.

The amount of the polymer compound having both a crosslinking reactive group and a hydrophilic group is determined as needed within a range of from 0.3 to 1.5 in terms of a weight ratio relative to the coloring material. It is preferred to adjust and determine its amount so that the colorant would have an average particle size not greater than 400 nm, preferably not greater than 200 nm, and the amount, in an aqueous phase after preparation, of water-soluble substances derived from the polymer compound having both a crosslinking reactive group and a hydrophilic group would be 1000 ppm or less.

A solution mixture containing at least the coloring material, the polymer compound having both a crosslinking reactive group and a hydrophilic group and the crosslinking agent in an organic solvent can be obtained, for example, by dispersing, through a dispersing machine such as beads mill, roll mill or sand mill, the coloring material in the organic solvent phase having the polymer compound having both a crosslinking reactive group and a hydrophilic group dissolved therein and then dissolving the crosslinking agent and if necessary, the oil-soluble catalyst in the resulting dispersion; or by dispersing the coloring material, which has been dispersed in water, (for example, wet cake of a pigment) in the polymer compound having both a crosslinking reactive group and a hydrophilic group by a dispersing machine under flushing, and then dissolving or dispersing the crosslinking agent and if necessary, the oil-soluble catalyst in the resulting dispersion. A dispersant or surfactant is usually employed for improving the dispersibility of the pigment. In the invention, a polymerizable surfactant is preferred. The "reactive surfactant" used herein has a similar meaning to the polymerizable surfactant which will be described later. As the polymerizable surfactant, that reactive with the polymer compound having both a crosslinking reactive group and a hydrophilic group or the crosslinking agent is employed. For fine grinding, the colorant thus obtained is preferably exposed to ultrasonic wave during phase reversal emulsification.

As the micro-encapsulated pigment, preferably used is a pigment coated with a polymer compound obtained from a polymerizable surfactant having a polymerizable group, a hydrophobic group and a hydrophilic group and a monomer.

The polymerizable surfactant has, in the molecule thereof, a hydrophobic group, a hydrophilic group and a polymerizable group. The hydrophilic group contains at least an anionic group selected from the group consisting of sulfone, sulfonic acid, carboxyl and carbonyl groups and salts thereof. The polymerizable group is preferably an unsaturated hydrocarbon group, more specifically, that selected from a class consisting of vinyl, allyl, acryloyl, methacryloyl, propenyl, vinylidene and vinylene groups. Specific examples of such a polymerizable surfactant include anionic allyl derivatives as described in JP-B-49-46291, JP-B-1-24142 or JP-A-62-104802, anionic propenyl derivatives as described in JP-A-62-221431, anionic acrylic acid derivatives as described in JP-A-62-34947 or JP-A-55-11525, anionic itaconic acid derivatives as described in JP-B-46-34898 or JP-A-51-30284, anionic maleic acid derivatives as described in JP-B-51-4157 or JP-A-51-30284, nonionic allyl derivatives as described in JP-A-62-104802, nonionic propenyl derivatives as described in JP-A-62-100502, nonionic acrylic acid derivatives as described in JP-A-56-28208, nonionic itaconic acid derivatives as described in JP-B-59-12681, and nonionic maleic acid derivatives as described in JP-A-59-74102.

The polymerizable surfactant is advantageous because adsorption to the surface of the pigment particles and excellent dispersion stability (in other words, ability of preventing agglomeration of particles) even under the subsequent polymerization conditions facilitate the formation of encapsulated particles.

In the invention, the compound represented by the below-described formula (1) is preferred as the polymerizable surfactant. The polymerizable surfactant of the formula (1) is disclosed in JP-A-5-320276 and JP-A-10-316909.

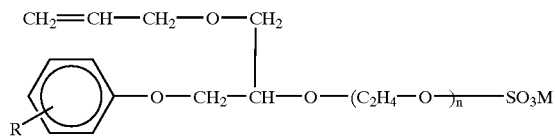

(1)

By adjusting the values of R and n in the above-described formula (1), the polymerizable surfactant suited to the hydrophilic degree or hydrophobic degree on the surface of the pigment can be prepared. Compounds represented by the below-described formulas (2) to (5) are specific preferred examples of the polymerizable surfactant represented by the formula (1). They may be used either singly or in combination.

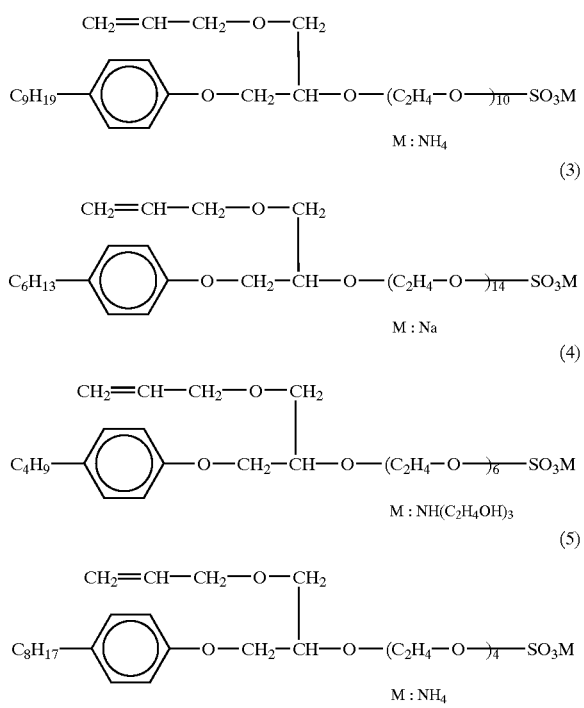

According to a preferred embodiment as the micro-encapsulated pigment, fine and stable encapsulated particles obtained by coating a pigment with a polymer compound which is a copolymer of the polymerizable surfactant, crosslinking monomer and a monomer copolymerizable therewith are used. Such micro-encapsulated pigment can be dispersed stably in an aqueous medium. The polymerizable surfactant represented by the formula (1) is particularly advantageous from the viewpoint of ease of forming encapsulated particles, because it is particularly excellent in adsorption to the surface of coloring material particles and dispersion stability (in other words, ability of preventing agglomeration of particles) under the subsequent polymerization conditions.

Commercially available products can also be used as the polymerizable surfactant. Examples include Aquaron HS series (Aquaron HS-05, HS-10, HS-20, HS-1025), Aquaron RN series (RN-10, RN-20, RN-30, RN-50, RN-2025) and New Frontier Series (New Frontier N-177E, S-510) of Dai-ichi Kogyo Yakuhin; and ADEKA REASOAP NE Series (NE-10, NE-20, NE-30, NE-40, NE-50) of Asahi Denka Kogyo.

The polymerizable surfactant is preferably added in an amount ranging from about 10 to 150 wt. %, more preferably about 20 to 100 wt. %, based on the coloring material. Amounts of 10% or greater make it possible to improve the dispersion stability of the ink composition. Amounts not greater than 150% make it possible to inhibit remaining of the polymerizable surfactant not adsorbed to the coloring material and prevent generation of a polymer other than capsule particles, resulting in an improvement of jetting stability of the ink composition.

As the copolymerizable monomer, ordinarily employed radical polymerizable monomers can be used. Examples include styrene and styrene derivatives such as methylstyrene, dimethylstyrene, chlorostyrene, dichlorostyrene, bromostyrene, P-chloromethylstyrene and divinylbenzene; monofunctional acrylate esters such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, 2-hydroxyethyl acrylate, 2-hydroxypropyl acrylate, caprolactone acrylate and glycidyl acrylate; monofunctional methacrylate esters such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobornyl methacrylate, 2-hydroxyethyl methacrylate, 2-hydroxypropyl methacrylate, 2-hydroxybutyl methacrylate, glycerol methacrylate, caprolactone methacrylate and glycidyl methacrylate; allyl compounds such as allyl benzene, allyl-3-cyclohexane propionate, 1-allyl-3,4-dimethoxydibenzene, allyl phenoxyacetate, allyl phenylacetate, allyl cyclohexane and allyl polycarboxylates; esters of fumaric acid, maleic acid and itaconic acid; and the other radical-polymerizable-group-containing monomers such as acrylonitrile, methacrylonitrile, N-substituted maleimide and cyclic olefins. The polymerizable surfactant represented by the formula (1) is a monomer having a high electron donating property, so that a monomer having a high electron accepting property is preferred. Specific examples of the monomer having a high electron accepting property include acrylonitrile, fumaronitrile, fumaric acid diester such as dibutyl fumarate; maleic acid diesters such as dibutyl maleate; maleimides such as N-phenylmaleimide; and vinylidene cyanide. They may be used either singly or in combination.

The monomer is preferably added in an amount ranging from about 2 to 15 molar ratios, more preferably about 3 to 12 molar ratios, relative to the polymerizable surfactant. By the addition in an amount of 2 molar ratios or greater, the encapsulated pigment particles thus obtained have excellent dispersion stability in an aqueous medium. Amounts not greater than 15 molar ratios, on the other hand, make it possible to sufficiently dissolve the monomer in the adsorption layer of the polymerizable surfactant, thereby suppressing the generation of a water-insoluble polymer or suppressing a relative decrease in the amount of an ionic repulsive group, leading to heightening of the dispersion stability of the ink composition.

For introduction of the hydrophilic group into the polymer compound, use of a copolymerizable monomer having a hydrophilic group is preferred. Examples of the acrylic monomer containing a carboxyl group include acrylic acid, methacrylic acid, crotonic acid, propylacrylic acid, isopropylacrylic acid, itaconic acid and fumaric acid, with acrylic acid and methacrylic acid being preferred. Those of the (meth) acrylic monomer containing a sulfonic acid group include sulfoethyl methacrylate and butylacrylamidosulfonic acid. Those of the (meth) acrylic monomer containing a phosphone group containing include phosphoethyl methacrylate.

As the crosslinking monomer to be used in the invention, any compound highly copolymerizable with the polymerizable surfactant is usable and a compound having two or more unsaturated hydrocarbon groups of at least one kind selected from vinyl, allyl, acryloyl, methacryloyl, propenyl, vinylidene and vinylene groups is preferred. Examples include ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentyl glycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxy-diethoxy)phenyl]propane, 2,2-bis[4-(acryloxyethoxy-polyethoxy)phenyl]propane, hydroxypivalic acid neopentyl glycol diacrylate, 1,4-butanediol diacrylate, dicyclopentanyl diacrylate, dipentaerythritol hexaacrylate, dipentaerythritol monohydroxypentaacrylate, ditrimethylol propanetetraacrylate, pentaerythritol triacrylate, tetrabromo(bisphenol A) diacrylate, triglycerol diacrylate, trimethylol propane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, tetrabromo(bisphenol A) dimethacrylate, dicyclopentanyl dimethacrylate, dipentaerythritol hexamethacrylate, glycerol dimethacrylate, hydroxypivalic acid neopentyl glycol dimethacrylate, dipentaerythritol monohydroxypentamethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate and diethylene glycol bisallylcarbonate.

As the polymerization initiator, a water-soluble polymerization initiator such as potassium persulfate, ammonium persulfate or sodium persulfate is employed.

It is presumed that in the micro-encapsulated pigment thus obtained, particularly, in the micro-encapsulated pigment obtained by coating the pigment with the polymer compound by emulsion polymerization using the polymerizable surfactant, the pigment particles have been coated completely with the polymer compound (have no coating-free portion) and at the same time, hydrophilic groups in the structure of the polymer compound have been oriented regularly on the surface of the particles toward the water phase. The micro-encapsulated pigment therefore has high dispersion stability. Moreover, when such a polymer compound has a crosslinked structure, orientation of the hydrophilic group toward the water phase is improved, leading to further heightening of dispersion stability and improvement of solvent resistance of the coating polymer, which makes it possible to realize an ink composition having excellent storage stability without agglomeration of pigment or viscosity increase even after storage for a long period of time. Use of such a micro-encapsulated pigment facilitates adjustment of the flowing characteristics and dynamic viscoelasticity of the ink composition at 20° C. to satisfy the above-specified flowing characteristics of the first to third ink sets and the above-specified dynamic viscoelasticity of the fourth ink set, respectively.

By this, it is possible to attain, with high accuracy, jetting stability of each ink and suppression of fluctuations in jetting amount of ink among colors and at the same time, to attain excellent jetting stability for a long period of time.

A description has been so far made on the colorant in detail. When a pigment or a water-insoluble or water-sparingly-soluble dye is used as the colorant, it is preferred to add a dispersant to the ink composition, thereby disperse the colorant completely in an aqueous medium. Here, a polymer dispersant or surfactant can be employed as the dispersant.

As the polymer dispersant, natural high molecules are preferred. Specific examples include proteins such as glue, gelatin, casein and albumin; natural rubbers such as gum arabic and tragacanth rubber, glucosides such as saponin; alginic acid derivatives such as alginic acid, alginic acid propylene glycol ester, alginic acid triethanolamine, ammonium alginate; and cellulose derivatives such as methyl cellulose, carboxymethyl cellulose, hydroxyethyl cellulose and ethylhydroxy cellulose. In addition, synthetic high molecules are also preferred as the polymer dispersant. Examples include polyvinyl alcohols, polyvinyl pyrrolidones, acrylic resins such as polyacrylic acid, acrylic acid-acrylonitrile copolymer, potassium acrylate-acrylonitrile copolymer, vinyl acetate-acrylate copolymer and acrylic acid-acrylate copolymer; styrene-acrylic resins such as styrene-acrylic acid copolymer, styrene-methacrylic acid copolymer, styrene-methacrylic acid-acrylate copolymer, styrene-(α-methylstyrene)-acrylic acid copolymer, and styrene-(α-methylstyrene)-acrylic acid-acrylate copolymer; styrene-maleic acid copolymer, styrene-maleic anhydride copolymer, vinylnaphthalene-acrylic acid copolymer, vinyl naphthalene-maleic acid copolymer; and vinyl acetate copolymers such as vinyl acetate-ethylene copolymer, vinyl acetate-fatty acid vinylethylene copolymer, vinyl acetate-maleate copolymer, vinyl acetate-crotonic acid copolymer and vinyl acetate-acrylic acid copolymer; and salts thereof. Among them, particularly preferred are copolymers of a hydrophobic-group-containing monomer and a hydrophilic-group-containing monomer and polymers made of a monomer having, in the molecule thereof, a hydrophobic group and a hydrophilic group in combination. As the copolymer, either one of random copolymer or block copolymer is usable. Examples of the above-described salts include salts with diethylamine, ammonia, ethylamine, triethylamine, propylamine, isopropylamine, dipropylamine, butylamine, isobutylamine, triethanolamine, diethanolamine, aminomethylpropanol and morpholine. These salt-forming compounds may be added in an amount of at least a neutralization equivalent of the dispersant, which is still in the form of an organic matter not a salt, but about 1.3 times the amount of the neutralization equivalent is preferred from the viewpoint of the fixation after printing.

Each of these copolymers preferably has a weight-average molecular weight of 1000 to 50000, more preferably 3000 to 10000.

Specific preferred examples of the surfactant as the dispersant include anionic surfactants typified by sulfonic acid type such as alkanesulfonate salts, α-olefinsulfonate salts, alkylbenzenesulfonate salts, alkylnaphthalinsulfonic acids, acylmethyltauric acids and dialkylsulfosuccinic acids; alkylsulfate ester salts, sulfated oils, sulfated olefins, and polyoxyethylene alkyl ether sulfate ester salts; carboxylic acid type such as fatty acid salts and alkylsarcosine salts; and phosphate ester type such as alkylphosphate ester salts, polyoxyethylene alkylether phosphate ester salts, monoglyceride phosphate ester salts; amphoteric surfactants typified by pyridium type such as alkylpyridium salts; amino acid type such as alkylamino acid salts, and betaine type such as alkyldimethylbetaine; and nonionic surfactants typified by ethylene oxide addition type such as polyoxyethylene alkyl ethers, polyoxyethylene alkyl phenyl ethers, polyoxyethylene alkyl esters, and polyoxyethylene alkyl amides; polyol ester type such as glycerin alkyl esters, sorbitan alkyl esters, and sugar alkyl esters; polyether type such as polyhydric alcohol alkyl ethers; and alkanolamide type such as alkanolamine fatty acid amides.

The above-exemplified dispersants are preferably added in an amount of about 1 to 50 wt. %, more preferably 2 to 30 wt. %, based on the colorant.

According to a preferred embodiment of the invention, salts of a styrene-(meth)acrylic acid copolymer are employed as the dispersant. These salts of a styrene-(meth) acrylic acid copolymer each essentially has, in the structure thereof, at least a styrene skeleton and a skeleton of the salt of (meth)acrylic acid and it may have, in the structure thereof, a skeleton derived from another unsaturated-group-containing monomer such as (meth)acrylate. Such a salt of styrene-(meth)acrylic acid copolymer may be either a random copolymer or a block copolymer and it is prepared by a known polymerization method such as radical copolymerization or group transfer polymerization. This salt of a styrene-(meth)acrylic acid copolymer has preferably an acid value ranging from 50 to 300, more preferably 70 to 150. It preferably has a weight-average molecular weight ranging from 1000 to 50000, more preferably 1000 to 150000, still more preferably 3000 to 10000.

As the above-described dispersant, commercially available one is usable. Specific examples include "Joncryl 68" (molecular weight: 10000, acid value: 195), "Joncryl 680" (molecular weight: 3900, acid value: 215), "Joncryl 682" (molecular weight: 1600, acid value: 235), "Joncryl 550" (molecular weight: 7500, acid value: 200), "Joncryl 555" (molecular weight: 5000, acid value: 200), "Joncryl 586" (molecular weight: 3100, acid value 105), "Joncryl 683" (molecular weight: 7300, acid value 150), and "B-36" (molecular weight: 6800, acid value: 250), each produced by Johnson Polymer Inc.

The colorant is dispersed with the aid of the above-exemplified dispersant, more specifically, the colorant, the dispersant and water, and if necessary a water-soluble organic solvent are dispersed by a proper dispersing machine such as ball mill, sand mill, attritor, roll mill, agitator mill, Henschel mixer, colloid mill, ultrasonic homogenizer, jet mill or Ong mill.

The ink composition constituting the ink set of the invention usually contains, as its solvent, water and a water-soluble organic solvent. This water and water-soluble organic solvent serve, for example, an aqueous medium upon dispersing the colorant.

According to a preferred embodiment of the invention, the ink composition is preferred to contain a polar solvent. Examples of the polar solvent include 2-pyrrolidone, N-methylpyrrolidone, ε-caprolactam, dimethylsulfoxide, sulfolane, morpholine, N-ethylmorpholine and 1,3-dimethyl-2-imidazolidinone. At least one selected from them is used.

The polar solvent is added in an amount of 0.01 to 20 wt. %, more preferably 1 to 10 wt. %, based on the ink composition. The amount is determined as needed so that the flowing characteristics and dynamic viscoelasticity of the ink composition at 20° C. would satisfy the above-specified flowing characteristics in the first to third ink sets or the above-specified dynamic viscoelasticity in the fourth ink set, each specified above.

According to a preferred embodiment of the invention, the ink composition contains, as a water-soluble organic solvent, the following components.

It preferably contains a wetting agent comprising a high-boiling-point water-soluble organic solvent in order to impart the ink composition with water retention and wettability. Preferred examples of such a solvent include polyhydric alcohols such as ethylene glycol, diethylene glycol, triethylene glycol, polyethylene glycol, polypropylene glycol, propylene glycol, butylene glycol, 1,2,6-hexane triol, thioglycol, hexylene glycol, glycerin and trimethylol propane. Of these, those having a boiling point of 180° C. or greater are preferred. These high-boiling-point water-soluble organic solvents may be used either singly or in combination. They are preferably added in an amount ranging from about 0.01 to 20 wt. %, more preferably 5 to 20 wt. % based on the ink composition.

According to a preferred embodiment of the invention, the ink composition further contains a glycol ether, with combined use of the glycol ether with the below-described acetylene glycol compound serving as a surfactant being particularly preferred.

According to a preferred embodiment of the invention, the ink composition further contains a 1,2-alkyldiol.

According to a preferred embodiment of the invention, the ink composition is preferred to contain a surfactant, particularly, anionic surfactant and/or honionic surfactant. Specific examples of the anionic surfactant include sulfonic acid type such as alkane sulfonate salts, α-olefin sulfonate salts, alkylbenzene sulfonate salts, alkyl naphthalin sulfonic acids, acylmethyltauric acids, dialkylsulfosuccinic acids; alkyl ether sulfate ester salts, sulfated oils, sulfated olefins, and polyoxyethylene alkyl ether sulfate ester salts; carboxylic acid type such as fatty acid salts and alkylsarcosine salts; and phosphate ester type such as alkylphosphate ester salts, polyoxyethylene alkyl ether phosphate ester salts, monoglyceride phosphate ester salts. Specific examples of the nonionic surfactant include ethylene oxide addition type such as polyoxyethylene alkyl ethers, polyoxyethylene alkyl phenyl ethers, polyoxyethylene alkyl esters, and polyoxyethylene alkyl amides; polyol ester type such as glycerin alkyl esters, sorbitan alkyl esters, and sugar alkyl esters; polyether type such as polyhydric alcohol alkyl ethers; and alkanolamide type such as alkanolamine fatty acid amides.

These surfactants are preferably added in an amount ranging from 0.01 to 10 wt. %, more preferably 0.1 to 5 wt. % based on the ink composition. The amount is determined as needed so that the flowing characteristics and dynamic viscoelasticity of the ink at 20° C. would satisfy the above-specified flowing characteristics in the first to third ink sets or the above-specified dynamic viscoelasticity in the fourth ink set.

According to a preferred embodiment of the invention, the ink composition desirably contains an acetylene glycol compound as a surfactant. Addition of the acetylene glycol compound heightens penetration of the ink composition to a recording medium, whereby printing with less feathering can be expected in various recording mediums.

Specific preferred examples of the acetylene glycol compound usable in the invention include compounds represented by the following formula (6):

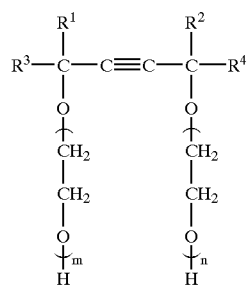

(6)

In the formula (6), m and n stand for numbers each satisfying the following expression: $0 \leqq m+n \leqq 50$, and $R_1$, $R_2$, $R_3$ and $R_4$ each independently represents an alkyl group (preferably an alkyl group having 6 or less carbon atoms).

Of the compounds represented by the formula (6), particularly preferred are 2,4,7,9-tetramethyl-5-decyne-4,7-diol, 3,6-dimethyl-4-octyne-3,6-diol and 3,5-dimethyl-1-hexyn-3-ol. As the compound represented by the formula (6), commercially available products put on the market as an acetylene glycol surfactant can be used. Specific examples include "Surfynol 104, 82, 465, 485 and TG" (each, available from Air Products and Chemicals Inc.) and "Orfin STG, Orfin E1010" (trade name; product of Nisshin Chemical).

According to a preferred embodiment of the invention, the ink composition preferably contains a penetrant further. Examples of the penetrant include alkyl ethers of a polyhydric alcohol such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether and dipropylene glycol mono-n-butyl ether; and diols of a linear hydrocarbon such as 1,3-propanediol, 1,4-butanediol, 1,5-pentanediol, 1,6-hexanediol, 1,7-heptanediol, 1,8-octanediol, 1,2-pentanediol and 1,2-hexanediol. Of these, especially preferred are propylene glycol monobutyl ether, dipropylene glycol monobutyl ether, diethylene glycol monobutyl ether, triethylene glycol monobutyl ether, 1,2-pentadiol and 1,2-hexanediol. These penetrants are preferably added in an amount of 0 to 20 wt. %, more preferably 0 to 10 wt. % based on the ink composition. It is determined as needed so that the flowing characteristics of the ink at 20° C. would satisfy the above-specified flowing characteristics of the first to fourth ink set. In particular, use of an alkanediol such as 1,2-pentanediol or 1,2-hexanediol markedly improves the drying property and reduces feather after printing.

The ink compositions each preferably has a surface tension of 20 to 45 mN/m, more preferably 30 to 40 mN/m. At a surface tension less than 20 mN/m, the nozzle head is wetted at its periphery, which presumably deteriorates jetting stability. At a surface tension exceeding 45 mN/m, on the other hand, there is a potential danger of feathering appears on paper or bleeding appears in multicolor printing.

The preferred composition of the ink composition is as follows:

| | |
|---|---|
| Pigment or water-insoluble or water-sparingly-soluble dye | 1 to 10 wt. % |
| Wetting agent | 0.01 to 20 wt. % |
| Polar solvent | 0.01 to 20 wt. % |
| Surfactant | 0.01 to 10 wt. % |
| Deionized water | Balance |

The more preferred composition of the ink composition is as follows:

| | |
|---|---|
| Pigment or water-insoluble or water-sparingly-soluble dye | 1 to 10 wt. % |
| Wetting agent | 5 to 20 wt. % |
| Polar solvent | 1 to 10 wt. % |
| Surfactant | 0.1 to 5 wt. % |
| Deionized water | Balance |

In particular, the preferred composition of the ink composition containing a self-dispersion type pigment having a hydrophilized surface is as follows:

| | |
|---|---|
| Self-dispersion type pigment having a hydrophilized surface | 3 to 8 wt. % |
| Wetting agent | 5 to 15 wt. % |
| Penetrant | 1 to 10 wt. % |
| Polar solvent | 1 to 5 wt. % |
| Surfactant | 0.1 to 2 wt. % |
| Deionized water | Balance |

Although the wetting agent to be used in the above-described preferred composition may be selected as needed from the above-exemplified high-boiling-point water-soluble solvents, polyhydric alcohols such as glycerin, ethylene glycol, diethylene glycol, triethylene glycol and polyethylene glycol are particularly preferred. More preferred is the use of glycerin in an amount of 5 to 15 wt. % from the viewpoints of prevention of clogging with ink and reliability.

The water-soluble polar solvent may be selected as needed from the above-exemplified ones, but 2-pyrrolidone and 1,3-dimethyl-2-imidazolidinone are preferred.

The surfactant may be selected as needed from the above-exemplified ones, but the anionic surfactants and/or nonionic surfactants are preferred, with the nonionic surfactant, particularly acetylene glycol surfactant being more preferred.

By adjusting the amount of each of the water-soluble polar solvent and surfactant, the flowing characteristics or dynamic viscoelasticity of the ink composition at 20° C. can be adjusted easily so as to satisfy the above-specified flowing characteristics in the first to third ink sets or the above-specified dynamic viscoelasticity in the fourth ink set, respectively.

The penetrant may be selected as needed from the above-exemplified ones, but preferred are diethylene glycol monobutyl ether, triethylene glycol monobutyl ether, 1,2-pentanediol and 1,2-hexanediol.

By adding the wetting agent and/or penetrant and moreover, adjusting the amount of each of the water-soluble polar solvent and surfactant, the flowing characteristics or dynamic viscoelasticity of the ink composition at 20° C. can be adjusted easily so as to satisfy the above-specified flowing characteristics in the first to third ink sets or the above-specified dynamic viscoelasticity in the fourth ink set, respectively.

At this time, the above-described ink composition is adjusted to have a surface tension, at 20° C., of 20 to 45 mN/m.

The preferred composition of the ink composition using a pigment or a water-insoluble or water-sparingly-soluble dye dispersed in an aqueous medium by a dispersant is as follows:

| | |
|---|---|
| Pigment or water-insoluble or water-sparingly-soluble dye | 1 to 5 wt. % |
| Dispersant | 2 to 30 wt. % (relative to the pigment or the above-described dye) |
| Wetting agent | 5 to 15 wt. % |
| Water-soluble polar solvent | 1 to 5 wt. % |
| Surfactant | 0.1 to 2 wt. % |
| Deionized water | Balance |

As the dispersant used for the above-described preferred composition, a polymer dispersant or surfactant is used. Particularly preferred are salts of a polymer compound having, in the molecule thereof, a moiety having an aromatic or aliphatic ring and a moiety having a carboxyl and/or sulfonic acid group.

Preferred examples of the wetting agent, water-soluble polar solvent and surfactant are similar to those in the preferred composition using the self-dispersion type pigment having a hydrophilized surface. In this composition, N-methylpyrrolidone is preferably employed as the water-soluble polar solvent.

Also in this composition, by adjusting the amount of each of the water-soluble polar solvent and surfactant, the flowing characteristics or dynamic viscoelasticity of the ink composition at 20° C. can be adjusted easily so as to satisfy the above-specified flowing characteristics in the first to third ink sets or the above-specified dynamic viscoelasticity in the fourth ink set, respectively.

Even after long-term storage, agglomeration or viscosity increase of the pigment of the ink composition does not occur so much and good storage stability can be actualized. When the ink composition is allowed to stand in an open state (in contact with air at room temperature), the fluidity and re-dispersibility can be maintained for long hours. Moreover, this ink composition is free from clogging of a nozzle during printing or re-starting after interruption of printing in an ink jet recording method, is free from curved flight and realizes good jetting stability.

According to a further preferred embodiment of the invention, the ink composition preferably contains polymer fine particles. In this invention, the term "polymer fine particles" means fine particles of a polymer component, preferably fine particles of a polymer having a film forming capacity.

The term "aqueous emulsion" which will be used later means an aqueous dispersion having water as a continuous phase and polymer fine particles as dispersed particles. This "aqueous emulsion" is sometimes called polymer emulsion or resin emulsion. Specific examples of the polymer component constituting polymer fine particles include acrylic resin, vinyl acetate resin, styrene-butadiene resin, polyvinyl chloride resin, acrylic-styrene resin, butadiene resin, styrene resin, crosslinked acrylic resin, crosslinked styrene resin, benzoguanamine resin, phenol resin, silicone resin, methacrylic acid resin, urethane resin, acrylamide resin and epoxy resin, and mixtures thereof. No limitation is imposed on the mode of copolymerization of these polymers. They may exist, for example, in the form of a block copolymer or random copolymer.

According to a particularly preferred embodiment of the invention, polymer fine particles preferably contain a polymer mainly comprising acrylate and/or methacrylate.

The polymer fine particles comprising a polymer having a film forming property, among the above-exemplified polymers, are preferred in the invention. The term "film forming property" means that a polymer film is formed by evaporation of water from an aqueous emulsion obtained by dispersing polymer fine particles in water. The ink composition to which these polymer fine particles have been added therefore has a property of forming a polymer film when its solvent component is evaporated. This polymer film serves to firmly adhere the coloring component in the ink composition to the surface of a recording medium. It is presumed that by this film, an image excellent in scratch resistance and water resistance can be realized.

According to a preferred embodiment of the invention, the polymer fine particles preferably have the lowest possible film-forming temperature not greater than room temperature, more preferably not greater than 30° C., most preferably not greater than 10° C. Although the polymer fine particles have a film forming property, film formation is preferably conducted at room temperature or lower. The term "lowest possible film-forming temperature" as used herein means the lowest temperature at which a transparent continuous film can be formed when a polymer emulsion obtained by dispersing polymer fine particles in water is cast thin on a metal plate such as aluminum and the temperature is raised gradually. At a temperature not higher than the lowest possible firm-forming temperature, they take a white powdery form. According to a more preferred embodiment of the invention, the glass transition point of the polymer fine particles is preferably 30° C. or lower.

According to another preferred embodiment of the invention, polymer fine particles are preferred to have a structure derived from a carboxyl-containing unsaturated vinyl monomer and a structure crosslinked by a crosslinking monomer having at least two polymerizable double bonds. Such polymer fine particles constitute a three-dimensional crosslinked structure by copolymerizing a crosslinking monomer having at least two, more preferably at least three polymerizable double bonds.

As the polymer fine particles in the invention, those having a single particle structure can be used. In the invention, on the other hand, polymer fine particles having a core-shell structure comprising a core surrounded by a shell can be used. In the invention, the term "core-shell structure" means "state of at least two polymers different in composition existing in the phase separated form in the particles". Accordingly, the core may be covered completely with the shell or the core may be covered partly with the shell. The polymer at the shell may partially form a domain or the like in the core particles. Alternatively, the polymer fine particles may have a multilayer structure of at least three layers having, between the core and the shell, at least one layer different in composition. The polymer fine particles having a core-shell structure are united together by a decrease in the amounts of water and water-soluble organic solvent and by the pressure upon film formation, they are transformed. It is presumed that owing to such a property, the reactive functional groups existing in both the core and shell bond each other, thereby forming a network structure. This is presumed to bring about a merit of forming a film having higher strength. In this invention, such a property of allowing reactive functional groups to co-exist in polymer fine particles, thereby forming a network structure is called "self crosslinking property".

The polymer fine particles can be prepared by known emulsion polymerization, more specifically, by emulsion polymerization of an unsaturated vinyl monomer in water containing therein a polymerization catalyst and an emulsifier.

Examples of the unsaturated vinyl monomer include acrylate monomers, methacrylate monomers, aromatic vinyl monomers, vinyl ester monomers, vinyl cyan compound monomers, halogenated monomers, olefin monomers and diene monomers, each ordinarily employed in emulsion polymerization. Specific examples include acrylates such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, cyclohexyl acrylate, phenyl acrylate, benzyl acrylate and glycidyl acrylate; methacrylates such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate and glycidyl methacrylate; vinyl esters such as vinyl acetate; vinyl cyan compounds such as acrylonitrile and methacrylonitrile; halogenated monomers such as vinylidene chloride and vinyl chloride; aromatic vinyl monomers such as styrene, 2-methylstyrene, vinyl toluene, t-butylstyrene, chlorostyrene, vinyl anisole and vinyl naphthalene; olefins such as ethylene, propylene and isopropylene; dienes such as butadiene and chloroprene; and vinyl monomers such as vinyl ether, vinyl ketone and vinyl pyrrolidone. For a monomer not having a carboxyl group, use of an unsaturated vinyl monomer having a carboxyl group is essential. Preferred specific examples of it include acrylic acid, methacrylic acid, itaconic acid, fumaric acid and maleic acid, with use of methacrylic acid being preferred. Emulsifiers usable here are anionic surfactants and nonionic surfactants, and mixtures thereof.

By the addition of an acrylamide or hydroxyl-containing monomer in addition to the above-exemplified monomers, printing stability can be improved further. Specific examples of the acrylamide include acrylamide and N,N'-dimethylacrylamide; while those of the hydroxyl-containing monomer include 2-hydroxyethyl acrylate, 2-hydroxypropyl acrylate, 2-hydroxyethyl methacrylate and 2-hydroxypropyl methacrylate. They can be used either singly or in combination.

The polymer fine particles having a core-shell structure can be prepared in a known manner, usually, by multistage emulsion polymerization. For example, they can be prepared by the process disclosed in JP-A-4-76004. As the unsaturated vinyl monomer used for polymerization, those similar to the above-exemplified ones are usable.

According to a further embodiment of the invention, polymer fine particles having, in the polymer structure thereof, a structure derived from a sulfonic acid group and/or salt thereof are preferably employed. Such polymer fine particles preferably have a structure derived from a sulfonic acid group and/or salt thereof and a structure crosslinked by a crosslinking monomer having at least two polymerizable double bonds. The structure derived from a sulfonic acid group and/or salt thereof can be introduced by using a sulfonic-acid-group containing monomer as a copolymerization component. Specific examples of the sulfonic-acid-group-containing monomer include vinyl sulfonic acid and salts thereof, styrenesulfonic acid and salts thereof, and 2-(meth)acryloylamino-2-methylpropanesulfonic acid and salts thereof.

Upon emulsion polymerization, an initiator, surfactant, molecular weight modifier, neutralizing agent and the like may be used in a conventional manner.

In the invention, polymer fine particles may be mixed, as fine particle powder, with another component of the ink composition, but are preferably mixed with another component of the ink composition after being dispersed in an aqueous medium to form a polymer emulsion. The content of the polymer fine particles is preferably about 0.1 to 10 wt. %, more preferably about 0.1 to 5 wt. % based on the ink composition. The polymer fine particles have a molecular weight of 10,000 or greater, preferably 100,000 or greater. The polymer fine particles have preferably a particle size of about 10 to 400 nm, more preferably about 50 to 200 nm.

The polymer fine particles are preferred to have, on the surface thereof, a hydrophilic group. As the hydrophilic group, a sulfonic acid group and salts thereof are preferred.

As the polymer fine particles, fine particles having a film forming property, having, on the surface thereof, a hydrophilic group (particularly, sulfonic acid group or salt thereof) and having a particle size of 50 to 200 nm are particularly preferred.

A preferred composition of the above-described ink composition further containing polymer fine particles is as follows:

| | |
|---|---|
| Pigment or water-insoluble or water-sparingly-soluble dye | 1 to 10 wt. % |
| Wetting agent | 0.01 to 20 wt. % |
| Polar solvent | 0.01 to 20 wt. % |
| Surfactant | 0.01 to 10 wt. % |
| Polymer fine particles | 0.1 to 10 wt. % |
| Deionized water | Balance |

A more preferred composition is as follows:

| | |
|---|---|
| Pigment or water-insoluble or water-sparingly-soluble dye | 1 to 10 wt. % |
| Wetting agent | 5 to 20 wt. % |
| Polar solvent | 1 to 10 wt. % |
| Surfactant | 0.1 to 5 wt. % |
| Polymer fine particles | 0.1 to 5 wt. % |
| Deionized water | Balance |

In particular, a preferred composition containing a self-dispersion type pigment having a hydrophilized surface is as follows:

| | |
|---|---|
| Self-dispersion type pigment having a hydrophilized surface | 3 to 8 wt. % |
| Wetting agent | 5 to 15 wt. % |
| Penetrant | 1 to 10 wt. % |
| Polar solvent | 1 to 5 wt. % |
| Surfactant | 0.1 to 2 wt. % |
| Polymer fine particles | 0.1 to 5 wt. % |
| Deionized water | Balance |

A preferred composition containing a pigment or a water-insoluble or water-sparingly-soluble dye dispersed in an aqueous medium by a dispersant is as follows:

| Pigment or water-insoluble or water-sparingly-soluble dye | 1 to 5 wt. % |
|---|---|
| Dispersant | 2 to 20 wt. % (based on the pigment or dye) |
| Wetting agent | 5 to 15 wt. % |
| Polar solvent | 1 to 5 wt. % |
| Polymer fine particles | 0.1 to 5 wt. % |
| Surfactant | 0.1 to 2 wt. % |
| Deionized water | Balance |

Preferred compositions containing a micro-encapsulated pigment are as follows:

| Micro-encapsulated pigment | 3 to 10 wt. % |
|---|---|
| Wetting agent | 5 to 15 wt. % |
| Polar solvent | 1 to 5 wt. % |
| Polymer fine particles | 0.1 to 10 wt. % |
| Deionized water | Balance |
| Micro-encapsulated pigment | 3 to 10 wt. % |
| Wetting agent | 5 to 15 wt. % |
| Penetrant | 1 to 10 wt. % |
| Surfactant | 0.1 to 2 wt. % |
| Polymer fine particles | 0.1 to 10 wt. % |
| Deionized water | Balance |
| Micro-encapsulated pigment | 3 to 10 wt. % |
| Wetting agent | 5 to 15 wt. % |
| Penetrant | 1 to 10 wt. % |
| Polar solvent | 1 to 5 wt. % |
| Surfactant | 0.1 to 2 wt. % |
| Polymer fine particles | 0.1 to 10 wt. % |
| Deionized water | Balance |

Preferred compositions of the ink composition containing a micro-encapsulated pigment are as follows:

| Micro-encapsulated pigment | 3 to 10 wt. % |
|---|---|
| Wetting agent | 5 to 15 wt. % |
| Polar solvent | 1 to 5 wt. % |
| Deionized water | Balance |
| Micro-encapsulated pigment | 3 to 10 wt. % |
| Wetting agent | 5 to 15 wt. % |
| Penetrant | 1 to 10 wt. % |
| Surfactant | 0.1 to 2 wt. % |
| Deionized water | Balance |
| Micro-encapsulated pigment | 3 to 10 wt. % |
| Wetting agent | 5 to 15 wt. % |
| Penetrant | 1 to 10 wt. % |
| Polar solvent | 1 to 5 wt. % |
| Surfactant | 0.1 to 2 wt. % |
| Deionized water | Balance |

Preferred examples of the wetting agent, penetrant, polar solvent and surfactant used in the above-described preferred compositions are similar to those in the above-described preferred composition containing the self-dispersion type pigment having a hydrophilized surface.

In these compositions, by adjusting the amount of each of the surfactant and/or polar solvent, the flowing characteristics or dynamic viscoelasticity of the ink composition at 20° C. can be adjusted easily so as to satisfy the above-specified flowing characteristics in the first to third ink sets or the above-specified dynamic viscoelasticity in the fourth ink set, respectively.

Since use of the micro-encapsulated pigment brings about superior dispersion stability to the use of an ordinary pigment which must be dispersed using a dispersant, the incorporation amount of the pigment can be increased easily. In addition, it is almost free from the influence on the dispersion stability which otherwise occurs in some ordinary pigments. These advantages make it possible to easily adjust the flowing characteristics or dynamic viscoelasticity of the ink composition at 20° C. to satisfy the above-specified flowing characteristics in the first to the third ink sets or the above-specified dynamic viscoelasticity in the fourth ink set, respectively.

The ink compositions incorporated in the ink jet recording ink set according to the invention were so far described. The nature and amount of each of the above-described additives are determined so that the flowing characteristics or dynamic viscoelasticity of each of the ink compositions at 20° C. would satisfy the above-specified flowing characteristics in the first to third ink set or the above-specified dynamic viscoelasticity in the fourth ink set, respectively. This makes it possible to attain, with high accuracy, jetting stability of each ink, and prevention of fluctuations in the jetting amount of the ink among colors.

The ink jet recording ink set of the invention is prepared using at least two ink compositions different in color, each of said ink compositions having flowing characteristics or dynamic viscoelasticity at 20° C. within the above-specified ranges. Preferred is the ink jet recording ink set in the form of an ink cartridge which can be fit to an ink jet printer.

By using the ink set of the invention, an excellent image recording method which permits good flight stability of an ink and ejection in a stable amount upon ink jetting and is therefore capable of forming a stable image can be provided. Moreover, by using the ink set of the invention, excellent recorded matter having a stable image formed thereon can be provided.

BRIEF DESCRIPTION OF THE DRAWINGS

FIG. 1 is a schematic view of a flowing characteristic curve of a pigment ink at 20° C. for explaining the second ink set of the invention;

FIG. 4 is a schematic view of a capillary type viscoelastometer for explaining the fourth ink set of the invention.

Figure 2:
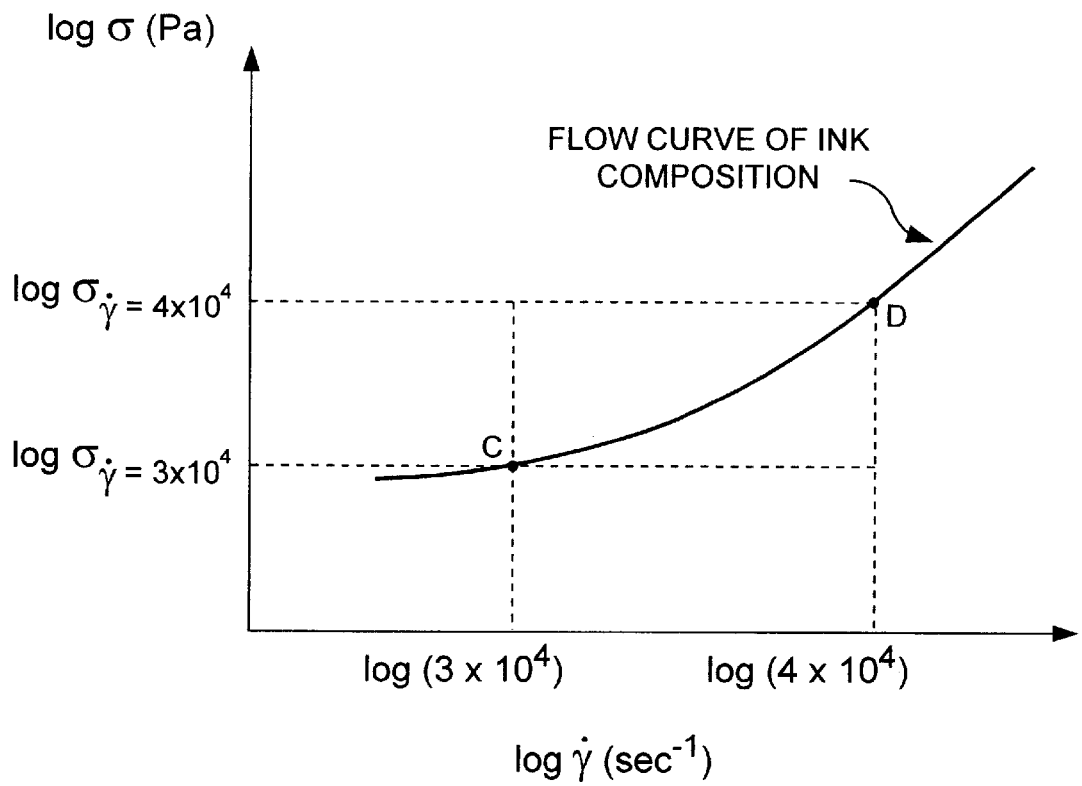
FIG. 2 is a schematic view of a flowing characteristic curve of a pigment ink at 20° C. for explaining the third ink set of the invention.

In these diagrams, indicated at numeral 1 is a viscoelastometer, 2 a test liquid, 3 a reservoir of the test liquid, 4 a thermostat, 5 an accurate measuring tube, 6 a thin film and 7 a sensor means.

EXAMPLES

The invention will be described in greater detail with reference to the following Examples and comparative Examples, but the present invention should not be construed as being limited thereto.

Preparation of a Micro-encapsulated Pigment Used in Examples (Black Micro-encapsulated Pigment "MCP1")

Black micro-encapsulated pigment "MCP1" was prepared in a similar manner to Example 1 of JP-A-10-316909. Described specifically, in a reactor equipped with an ultrasonic generator, stirrer and a temperature controller, 5 g of carbon black, 3 g of "ADEKA REASOAP SE-10N" (product of Asahi Denka Kogyo) as a polymerizable surfactant and 60 g of deionized water were charged, followed by exposure to ultrasonic wave for 4 hours, whereby the mixture was pulverized. Then, 1.6 g of acrylonitrile and 0.05 g of potassium persulfate were added, and the resulting mixture was polymerized at 60° C. for 48 hours. The target product thus obtained was filtered through a 0.4-μm filter to remove coarse particles. The resulting micro-encapsulated pigment was found to have an average particle size of 130 nm. The average particle size was measured by Micro Track D.H.S.DPA (product of MOONTECH). In this manner, "MCP1", a micro-encapsulated pigment was obtained. The resulting micro-encapsulated pigment is in the form of a dispersion.

(Magenta Micro-encapsulated Pigment "MCP2")

To 1000 g of deionized water were added 100 g of C.I. pigment Red 122 and 60 g of "ADEKA REASOAP SE-10N" (product of Asahi Denka Kogyo) as a polymerizable surfactant. The resulting mixture was exposed to ultrasonic wave from an ultrasonic generator for 2 hours to disperse the mixture, followed by further dispersing treatment for about 2 hours in a sand mill. The resulting dispersion was charged in a reaction vessel equipped with an ultrasonic generator, stirrer, temperature controller, reflux condenser and dropping funnel. A monomer mixer which had been prepared in advance by mixing 15 g of benzyl methacrylate, 15 g of butyl methacrylate and 10 g of methacrylic acid and 1 g of potassium persulfate were then added. The resulting mixture was polymerized at 60° C. for 48 hours. The target product thus obtained was adjusted to have pH 8 with potassium hydroxide, and filtered through a 0.4-μm filter to remove coarse particles. In this manner, "MCP2", a micro-encapsulated pigment was obtained. This micro-encapsulated pigment was found to have an average particle size of 130 nm. The resulting micro-encapsulated pigment is in the form of a dispersion.

(Cyan Micro-encapsulated Pigment "MCP3")

To 1000 g of deionized water were added 100 g of C.I. pigment Blue 15:3 and 60 g of "ADEKA REASOAP SE-10N" (product of Asahi Denka Kogyo) as a polymerizable surfactant. The resulting mixture was exposed to ultrasonic wave from an ultrasonic generator for 2 hours to disperse the mixture, followed by further dispersing treatment for about 2 hours in a sand mill. The resulting dispersion was charged in a reaction vessel equipped with an ultrasonic generator, stirrer, temperature controller, reflux condenser and dropping funnel. A monomer mixer which had been prepared in advance by mixing 10 g of 2-acrylamido-2-methylpropanesulfonic acid, 10 g of acrylonitrile, 20 g of benzyl methacrylate and 15 g of butyl methacrylate and 1 g of potassium persulfate were added. The resulting mixture was polymerized at 60° C. for 48 hours. The target product thus obtained was adjusted to have pH 8 with potassium hydroxide, and filtered through a 0.4-μm filter to remove coarse particles. In this manner, "MCP3", a micro-encapsulated pigment was obtained. This micro-encapsulated pigment was found to have an average particle size of 130 nm. The resulting micro-encapsulated pigment is in the form of a dispersion.

(Yellow Micro-Encapsulated Pigment "MCP4")

To 1000 g of deionized water were added 100 g of C.I. pigment Yellow 185 and 60 g of "ADEKA REASOAP SE-10N" (product of Asahi Denka Kogyo) as a polymerizable surfactant. The resulting mixture was exposed to ultrasonic wave from an ultrasonic generator for 2 hours to disperse the mixture, followed by further dispersing treatment for about 2 hours in a sand mill. The resulting dispersion was charged in a reaction vessel equipped with an ultrasonic generator, stirrer, temperature controller, reflux condenser and dropping funnel. A monomer mixer which had been prepared in advance by mixing 20 g of acrylonitrile and 20 g of dibutyl fumarate and 1 g of potassium persulfate were added. The resulting mixture was polymerized at 60° C. for 48 hours. The target product thus obtained was adjusted to have pH 8 with potassium hydroxide, and filtered through a 0.4-μm filter to remove coarse particles. In this manner, "MCP4", a micro-encapsulated pigment was obtained. This micro-encapsulated pigment was found to have an average particle size of 130 nm. The resulting micro-encapsulated pigment is in the form of a dispersion.

(Black Micro-Encapsulated Pigment "MCP5")

To 500 g of deionized water in a reaction vessel equipped with an ultrasonic generator, stirrer, temperature controller, reflux condenser and dropping funnel were added 50 g of carbon black and 30 g of "ADEKA REASOAP SE-10N" (product of Asahi Denka Kogyo) as a polymerizable surfactant. The resulting mixture was exposed to ultrasonic wave for 4 hours for dispersion. Then, 16 g of acrylonitrile, 2.4 g of divinylbenzene and 0.5 g of potassium persulfate were added to the dispersion, followed by polymerization at 60° C. for 48 hours. The product thus obtained was adjusted to about pH 8 by potassium hydroxide and then filtered through a 0.4-μm filter to remove coarse particles. In this manner, "MCP5", a micro-encapsulated pigment was obtained. This micro-encapsulated pigment was found to have an average particle size of 130 nm. The resulting micro-encapsulated pigment is in the form of a dispersion.

(Magenta Micro-Encapsulated Pigment "MCP6")

To 700 g of deionized water were added 100 g of C.I. pigment Red 122 and 30 g of "ADEKA REASOAP SE-10N" (product of Asahi Denka Kogyo) as a polymerizable surfactant. The resulting mixture was exposed to ultrasonic wave and then dispersed further in a sand mill (product of Yasukawa Seisakujo) for about 2 hours. The resulting dispersion was charged in a reaction vessel equipped with an ultrasonic generator, stirrer, temperature controller, reflux condenser and dropping funnel. An emulsion which had been prepared in advance by mixing 20 g of benzyl methacrylate, 40 g of butyl methacrylate, 10 g of dicyclopentanyl dimethacrylate, 20 g of methacrylic acid, 2 g of the above-described polymerizable surfactant, 1 g of potassium persulfate and 10 g of deionized water was added dropwise to the reaction vessel through the dropping funnel. After completion of the dropwise addition, polymerization was conducted at 60° C. for 48 hours. The resulting dispersion of the colorant was adjusted to have pH 8 with potassium hydroxide, and filtered through a 0.4-μm filter to remove coarse particles. In this manner, "MCP6", a micro-encapsulated pigment was obtained. This micro-encapsulated pigment was found to have an average particle size of 130 nm. The resulting micro-encapsulated pigment is in the form of a dispersion.

(Cyan Micro-Encapsulated Pigment "MCP7")

To 800 parts by weight of deionized water in a reaction vessel equipped with an ultrasonic generator, stirrer, temperature controller, reflux condenser and dropping funnel, 100 g of C.I. pigment Blue 15:3 and 60 g of "SE-10N" (product of Asahi Denka Kogyo) as a polymerizable surfactant were added. The resulting mixture was exposed to ultrasonic wave for 4 hours for dispersion. Then, 30 parts by weight of 2-acrylamido-2-methylpropanesulfonic acid, 50 parts by weight of benzyl methacrylate, 20 g of divinylbenzene and 1 part by weight of potassium persulfate were added to the dispersion, followed by polymerization at 60° C. for 48 hours. The resulting dispersion of the colorant was adjusted to about pH 8 by potassium hydroxide and then, filtered through a 0.4-μm filter to remove coarse particles. In this manner, "MCP7", a micro-encapsulated pigment was obtained. This micro-encapsulated pigment was found to have an average particle size of 130 nm. The resulting micro-encapsulated pigment is in the form of a dispersion.
(Yellow Micro-encapsulated Pigment "MCP8")

To 1000 g of deionized water were added 100 g of C.I. pigment Yellow 185 and 60 g of "ADEKA REASOAP SE-10N" (product of Asahi Denka Kogyo) as a polymerizable surfactant. The resulting mixture was dispersed by exposing it to ultrasonic wave from an ultrasonic generator for 2 hours and then dispersed further in a sand mill for about 2 hours. The resulting dispersion was charged in a reaction vessel equipped with an ultrasonic generator, stirrer, temperature controller, reflux condenser and dropping funnel. An emulsion which had been prepared in advance by mixing 20 g of benzyl methacrylate, 40 g of butyl methacrylate, 10 g of diethylene glycol dimethacrylate, 20 g of methacrylic acid, 2 g of the above-described polymerizable surfactant, 1 g of potassium persulfate and 10 g of deionized water was added dropwise to the reaction vessel through the dropping funnel. After completion of the dropwise addition, polymerization was conducted at 60° C. for 48 hours. The resulting dispersion of the colorant was adjusted to pH 8 with potassium hydroxide, and filtered through a 0.4-μm filter to remove coarse particles. In this manner, "MCP8", a micro-encapsulated pigment was obtained. This micro-encapsulated pigment was found to have an average particle size of 130 nm. The resulting micro-encapsulated pigment is in the form of a dispersion.
(Magenta Micro-Encapsulated Pigment "MCP9")

This pigment was prepared, in accordance with the acidification method described in JP-A-9-151342, by coating C.I. pigment Red 122 with a styrene-acrylate-methacrylic acid copolymer. The capsule thus obtained has an average particle size of 150 nm.
(Cyan Micro-encapsulated Pigment "MCP10")

In a similar manner to that employed for "MCP9" except for the use of C.I. pigment Blue 15:3, a cyan micro-encapsulated pigment "MCP10" was obtained. It has an average particle size of 150 nm.
(Yellow Micro-Encapsulated Pigment "MCP11")

In a similar manner to that employed for "MCP9" except for the use of C.I. pigment Yellow 138, a yellow micro-encapsulated pigment "MCP11" was obtained. It has an average particle size of 150 nm.
(Yellow Micro-Encapsulated Pigment "MCP12")

In a similar manner to that employed for "MCP9" except for the use of C.I. pigment Yellow 73, a yellow micro-encapsulated pigment "MCP12" was obtained. It has an average particle size of 150 nm.

The above-described micro-encapsulated pigments to be used in Examples will be summarized below in Table A.

TABLE A

|  |  | MCP1 | | MCP2 | | MCP3 | | MCP4 | | MCP5 | | MCP6 | |
|---|---|---|---|---|---|---|---|---|---|---|---|---|---|
|  |  | g | wt. % | g | wt. % | g | wt. % | g | wt. % | g | wt. % | g | wt. % |
| Pigment | Carbon black | 5 | 7.18 | | | | | | | 50 | 8.35 | | |
|  | C.I. pigment Red 122 | | | 100 | 8.33 | | | | | | | 100 | 10.72 |
|  | C.I. pigment Blue 15:3 | | | | | 100 | 8.22 | | | | | | |
|  | C.I. pigment Yellow 185 | | | | | | | 100 | 8.33 | | | | |
|  | C.I. pigment Yellow 138 | | | | | | | | | | | | |
|  | C.I. pigment Yellow 73 | | | | | | | | | | | | |
| Polymerizable surfactant | ADEKA REA-SOAP SE-10N | 3 | 4.31 | 60 | 5.00 | 60 | 4.93 | 60 | 5.00 | 30 | 5.01 | 32 | 3.43 |
| Copolymerizable monomer | Acrylonitrile | 1.6 | 2.30 | | | 10 | 0.82 | 20 | 1.67 | 16 | 2.67 | | |
|  | Benzyl methacrylate | | | 15 | 1.25 | 20 | 1.64 | | | | | 20 | 2.14 |
|  | Butyl methacrylate | | | 15 | 1.25 | 15 | 1.23 | | | | | 40 | 4.29 |
|  | Methacrylic acid | | | 10 | 0.83 | | | | | | | 20 | 2.14 |
|  | 2-acrylamido-2-methylpropanesulfonic acid | | | | | 10 | 0.82 | | | | | | |
|  | Dibutyl fumarate | | | | | | | 20 | 1.67 | | | | |
|  | Dicyclopentanyl dimethacrylate | | | | | | | | | | | 10 | 1.07 |
|  | Divinylbenzene | | | | | | | | | 2.4 | 0.40 | | |
|  | Diethylene glycol dimethacrylate | | | | | | | | | | | | |
| Polymerization initiator | Potassium persulfate | 0.05 | 0.07 | 1 | 0.08 | 1 | 0.08 | 1 | 0.08 | 0.5 | 0.08 | 1 | 0.11 |
| Deionized water | Deionized water | 60 | 86.15 | 1000 | 83.26 | 1000 | 82.24 | 1000 | 83.26 | 500 | 83.49 | 710 | 76.10 |
| Total |  | 69.65 | 100.00 | 1201 | 100.00 | 1216 | 100.00 | 1201 | 100.00 | 598.9 | 100.00 | 933 | 100.00 |
| Ratio of micro-encapsulated pigment |  |  | 13.78 |  | 16.65 |  | 17.68 |  | 16.65 |  | 16.43 |  | 23.79 |

|  |  | MCP7 | | MCP8 | | MCP9 | MCP10 | MCP11 | MCP12 |
|---|---|---|---|---|---|---|---|---|---|
|  |  | g | wt. % | g | wt. % | | | | |
| Pigment | Carbon black | | | | | | | | |
|  | C.I. pigment Red 122 | | | | | o | | | |
|  | C.I. pigment Blue 15:3 | 100 | 9.43 | | | | o | | |
|  | C.I. pigment Yellow 185 | | | 100 | 7.92 | | | | |
|  | C.I. pigment Yellow 138 | | | | | | | o | |
|  | C.I. pigment Yellow 73 | | | | | | | | o |

TABLE A-continued

| | | | | | | Coating of Styrene-acrylate-methacrylic acid copolymer by acidification method | Coating of Styrene-acrylate-methacrylic acid copolymer by acidification method | Coating of Styrene-acrylate-methacrylic acid copolymer by acidification method | Coating of Styrene-acrylate-methacrylic acid copolymer by acidification method |
|---|---|---|---|---|---|---|---|---|---|
| Polymerizable surfactant | ADEKA REA-SOAP SE-10N | 60 | 5.66 | 62 | 4.91 | | | | |
| Copolymerizable monomer | Acrylonitrile | | | | | | | | |
| | Benzyl methacrylate | 50 | 4.71 | 20 | 1.58 | | | | |
| | Butyl methacrylate | | | 40 | 3.17 | | | | |
| | Methacrylic acid | | | 20 | 1.58 | | | | |
| | 2-acrylamido-2-methylpropanesulfonic acid | 30 | 2.83 | | | | | | |
| | Dibutyl fumarate | | | | | | | | |
| | Dicyclopentanyl dimethacrylate | | | | | | | | |
| | Divinylbenzene | 20 | 1.89 | | | | | | |
| | Diethylene glycol dimethacrylate | | | 10 | 0.79 | | | | |
| Polymerization initiator | Potassium persulfate | 1 | 0.09 | 1 | 0.08 | | | | |
| Deionized water | Deionized water | 800 | 75.40 | 1010 | 79.97 | | | | |
| Total | | 1061 | 100.00 | 1263 | 100.00 | | | | |
| Ratio of micro-encapsulated pigment | | | 24.51 | | 19.95 | | | | |

Preparation of an Ink Set to be Used in Examples (Preparation of a Magenta Ink of the Ink Set of Example 1)

In a sand mill, 5 wt. % of C.I. pigment Red 122, 1 wt. % of an ammonium salt (molecular weight: 7000, polymer content: 38%) of a styrene-acrylic acid copolymer and 15 wt. % of deionized water were mixed and dispersed for 2 hours. An ink solvent, which had been prepared in advance by adding 10 wt. % of glycerin, 8 wt. % of diethylene glycol, 2 wt. % of 2-pyrrolidone, 1 wt. % of "Orfin E1010" (a surfactant, product of Nisshin Chemical Industry) and 0.9 wt. % of triethanolamine to the balance of deionized water, was added dropwise to the dispersion prepared above under stirring. At normal temperature, they were stirred sufficiently. The resulting mixture was filtered through a 3-μm membrane filter, whereby an ink composition was obtained.

The other ink compositions in the ink set of Example 1, the ink compositions in the ink set of Comparative Example 1, and magenta ink in the ink sets of Example 11 and Comparative Example 2 were prepared similarly to have the compositions as shown in Tables 1 to 5.

(Preparation of a Magenta Ink of the Ink Set of Example 2)

An ink solvent was prepared by mixing 15 g of glycerin, 4 g of 2-pyrrolidone, 20.5 g of water and 10 g of 10% potassium hydroxide. The resulting ink solvent was added dropwise to 50.5 g of the dispersion of "MCP1" (7 g of "MCP1", a micro-encapsulated pigment of carbon black) under stirring, followed by sufficient stirring at normal temperature. The reaction mixture was then filtered through a 3-μm membrane filter, whereby an ink composition was obtained.

The other ink compositions in the ink set of Example 2, the ink compositions in the ink sets of Examples 3 to 10, and cyan ink and yellow ink in the ink sets of Example 11 and Comparative Example 2 were prepared similarly to have the compositions as shown in Tables 2 to 5.

In Tables 1 to 5, "wt. %" means "weight %" and colorant, dispersant and potassium hydroxide are expressed as a solid concentration.

TABLE 1

| | Colorant | | | | Dispersant Sty-Acr copoly. Ammonium salt (wt. %) | Wetting agent | | Polar solvent | Surfactant | PH regulator | | Water |
|---|---|---|---|---|---|---|---|---|---|---|---|---|
| | | | | | | DEG | Gly | 2-Pyr | Orfin E1010 | KOH | TEA | Deionized |
| Ink set | CB | R122 | B15:3 | Y185 | | (wt. %) | (wt. %) | (wt. %) | (wt. %) | (wt. %) | (wt. %) | water |
| Ex. 1 | | | | | | | | | | | | |
| M | | 5 | | | 1 | 8 | 10 | 2 | 1 | — | 0.9 | Balance |
| C | | | 5 | | 1 | 8 | 10 | 2 | 1 | — | 0.9 | Balance |
| Y | | | | 5 | 1 | 8 | 10 | 2 | 1 | — | 0.9 | Balance |
| Comp Ex. 1 | | | | | | | | | | | | |
| B | 5 | | | | 1 | 10 | 15 | — | — | 0.1 | — | Balance |
| M | | 5 | | | 1 | 8 | 10 | 2 | 1 | 0.1 | — | Balance |
| C | | | 5 | | 1 | 8 | 10 | 2 | 1 | 0.1 | — | Balance |
| Y | | | | 5 | 1 | 10 | 15 | — | — | 0.1 | — | Balance |

B: Black ink, M: Magenta ink, C: Cyan ink, Y: Yellow ink
CB: Carbon black, R122, C.I. pigment Red 122, B15:3: CI pigment Blue 15:3, Y185: C.I. pigment Yellow 185
Sty-Acr copoly. ammonium salt: Ammonium salt of styrene-acrylic acid copolymer (molecular weight: 7000, polymer component 38%),
DEG: Diethylene glycol, Gly: Glycerin, 2-Pyr: 2-Pyrrolidone, KOH: Potassium hydroxide, TEA: Triethanolamine

TABLE 2

| | Colorant | | | | Wetting agent | Polar solvent | | Surfactant | | PH regulator | Water |
| | | | | | | 2-Pyr | 1,3-DM-2-IMD | Surfynol 465 | Orfin E1010 | KOH | |
| | MCP1 | MCP2 | MCP3 | MCP4 | Gly (wt. %) | (wt. %) | (wt. %) | (wt. %) | (wt. %) | (wt. %) | Deionized water |
|---|---|---|---|---|---|---|---|---|---|---|---|
| Ex. 2 | | | | | | | | | | | |
| B | 7 | | | | 15 | 4 | — | — | — | 0.1 | Balance |
| M | | 7 | | | 15 | 4 | — | — | — | 0.1 | Balance |
| C | | | 7 | | 15 | — | 4 | — | — | 0.1 | Balance |
| Y | | | | 7 | 15 | — | 4 | — | — | 0.1 | Balance |
| Ex. 3 | | | | | | | | | | | |
| B | 8 | | | | 15 | 4 | — | 1 | — | 0.1 | Balance |
| M | | 8 | | | 15 | 4 | — | 1 | — | 0.1 | Balance |
| C | | | 8 | | 15 | — | 4 | — | 1 | 0.1 | Balance |
| Y | | | | 8 | 15 | — | 4 | — | 1 | 0.1 | Balance |
| Ex. 4 | | | | | | | | | | | |
| B | 8 | | | | 15 | 4 | — | 2 | — | 0.1 | Balance |
| M | | 8 | | | 15 | 4 | — | 2 | — | 0.1 | Balance |
| C | | | 8 | | 15 | — | 4 | — | 2 | 0.1 | Balance |
| Y | | | | 8 | 15 | — | 4 | — | 2 | 0.1 | Balance |

B: Black ink, M: magenta ink, C: cyan ink, Y: Yellow ink, Gly: Glycerin, 2-Pyr: 2-Pyrrolidone, 1,3-DM-2-IMD: 1,3-Dimethyl-2-imidazolidinone, KOH: Potassium hydroxide

TABLE 3

| | Colorant | | | | Wetting agent | Polar solvent | | Penetrant | | Surfactant | | PH regulator | Water |
| | | | | | Gly | 2-Pyr | 1,3-DM-2-IMD | TEG-m-BE | 1,2-HD | Surfynol 465 | Orfin E1010 | KOH | Deionized |
| | MCP5 | MCP6 | MCP7 | MCP8 | (wt. %) | (wt. %) | (wt. %) | (wt. %) | (wt. %) | (wt. %) | (wt. %) | (wt. %) | water |
|---|---|---|---|---|---|---|---|---|---|---|---|---|---|
| Ex. 5 | | | | | | | | | | | | | |
| B | 8 | | | | 15 | 1 | — | 5 | 3 | 1 | — | 0.1 | Balance |
| M | | 8 | | | 15 | 1 | — | 5 | 3 | 1 | — | 0.1 | Balance |
| C | | | 8 | | 15 | — | 1 | 5 | 3 | — | 1 | 0.1 | Balance |
| Y | | | | 8 | 15 | — | 1 | 5 | 3 | — | 1 | 0.1 | Balance |
| Ex. 6 | | | | | | | | | | | | | |
| B | 8 | | | | 15 | 4 | — | 5 | 3 | 1 | — | 0.1 | Balance |
| M | | 8 | | | 15 | 4 | — | 5 | 3 | 1 | — | 0.1 | Balance |
| C | | | 8 | | 15 | — | 4 | 5 | 3 | — | 1 | 0.1 | Balance |
| Y | | | | 8 | 15 | — | 4 | 5 | 3 | — | 1 | 0.1 | Balance |
| Ex. 7 | | | | | | | | | | | | | |
| B | 8 | | | | 15 | 4 | — | 5 | 3 | 2 | — | 0.1 | Balance |
| M | | 8 | | | 15 | 4 | — | 5 | 3 | 2 | — | 0.1 | Balance |
| C | | | 8 | | 15 | — | 4 | 5 | 3 | — | 2 | 0.1 | Balance |
| Y | | | | 8 | 15 | — | 4 | 5 | 3 | — | 2 | 0.1 | Balance |
| Ex. 8 | | | | | | | | | | | | | |
| B | 8 | | | | 15 | 4 | — | 5 | 3 | 1 | 1 | 0.1 | Balance |
| M | | 8 | | | 15 | 4 | — | 5 | 3 | 1 | 1 | 0.1 | Balance |
| C | | | 8 | | 15 | — | 4 | 5 | 3 | 1 | 1 | 0.1 | Balance |
| Y | | | | 8 | 15 | — | 4 | 5 | 3 | 1 | 1 | 0.1 | Balance |

B: Black ink, M: Magenta ink, C: Cyan ink, Y: Yellow ink, Gly: Glycerin, 2-Pyr: 2-Pyrrolidone, 1,3-DM-2-IMD: 1,3-Dimethyl-2-imidazolidinone, TEG-m-BE: Triethylene glycol monobutyl ether, 1,2-HD: 1,2-Hexanediol, KOH: Potassium hydroxide

TABLE 4

| Ink set | Colorant MCP9 | Colorant MCP10 | Colorant MCP11 | Wetting agent Gly (wt. %) | Polar solvent 2-Pyr (wt. %) | Polar solvent 1,3-DM-2-IMD (Wt. %) | Surfactant Surfynol 465 (wt. %) | PH regulator KOH (wt. %) | Water Deionized water |
|---|---|---|---|---|---|---|---|---|---|
| Ex. 9 | | | | | | | | | |
| M | 3 | | | 15 | — | 2 | 1 | 0.1 | Balance |
| C | | 3 | | 15 | 2 | — | 1 | 0.1 | Balance |
| Y | | | 3 | 15 | — | 2 | 1 | 0.1 | Balance |

M: Magenta ink, C: Cyan ink, Y: Yellow ink
Gly: Glycerin, 2-Pyr: 2-Pyrrolidone, 1,3-DM-2-IMD: 1,3-Dimethyl-2-imidazolidinone, KOH: Potassium hydroxide

TABLE 5

| Ink set | Colorant MCP9 | Colorant R122 | Colorant MCP10 | Colorant MCP12 | Dispersant Sty-acr copoly. (wt. %) | Wetting agent Gly (wt. %) | Wetting agent EG (wt. %) | Penetrant TEG-m-BE (wt. %) | Penetrant 1,2-HD (wt. %) | Polar solvent 2-Pyr (wt. %) | Surfactant Surfynol 465 (wt. %) | Surfactant Orfin E1010 (wt. %) | PH regulator TEA (wt. %) | Water Deionized water |
|---|---|---|---|---|---|---|---|---|---|---|---|---|---|---|
| Ex. 10 | | | | | | | | | | | | | | |
| M | 3 | | | | — | 15 | — | — | — | 2 | 1 | — | 1 | Balance |
| C | | | 3 | | — | 15 | — | — | — | 2 | 1 | — | 1 | Balance |
| Y | | | | 3 | — | 15 | — | — | — | 2 | 1 | — | 1 | Balance |
| Ex. 11 | | | | | | | | | | | | | | |
| M | | 5 | | | 1 | 10 | 8 | — | 5 | 2 | — | 1 | 0.9 | Balance |
| C | | | 3 | | — | 15 | — | — | — | 2 | 1 | — | 1 | Balance |
| Y | | | | 3 | — | 15 | — | — | — | 2 | 1 | — | 1 | Balance |
| Comp. Ex. 2 | | | | | | | | | | | | | | |
| M | | 5 | | | 1 | 15 | 10 | — | — | — | — | — | 0.9 | Balance |
| C | | | 3 | | 1 | 15 | — | — | — | 2 | 1 | — | 0.9 | Balance |
| Y | | | | 3 | 1 | 15 | — | — | — | 2 | 1 | — | 0.9 | Balance |

M: Magenta ink, C: Cyan ink, Y: Yellow ink
R122, C.I. pigment Red 122, Sty-Acr copoly.: Styrene-acrylic acid copolymer (molecular weight: 11000, acid value: 150) Gly: Glycerin, EG: Ethylene glycol, TEG-m-BE: Triethylene glycol monobutyl ether, 1,2-HD: 1,2-Hexanediol, 2-Pyr: 2-Pyrrolidone, TEA: Triethanolamine Measurement of Flowing Characteristics of the Ink Compositions Flowing characteristics of each of the ink compositions constituting each of the ink sets of Examples 1 to 11 and Comparative Examples 1 and 2 were measured at 20° C. in accordance with the method as described above.

Determined were:

1) "difference in zero shear viscosity" and "difference in the slope of a sin θ vs. viscosity curve" (measured using an automated microviscometer (rolling-ball system) "AMVn" (manufactured by Paar Physica));

2) slope of line AB (refer to FIG. 1; measured using a rotary viscometer "Fluids Spectrometer RSAII" (manufactured by Rheometric Scientific));

3) slope of line CD (refer to FIT. 2; measured using a high-shear capillary viscometer "HVA6" (manufactured by Anton Paar); and 4) slope of line EF (measured under stress control by using "PHYSICA MCR300" (manufactured by Paar Physica). These results are shown in Tables 6 to 8.

TABLE 6

Figure 3:
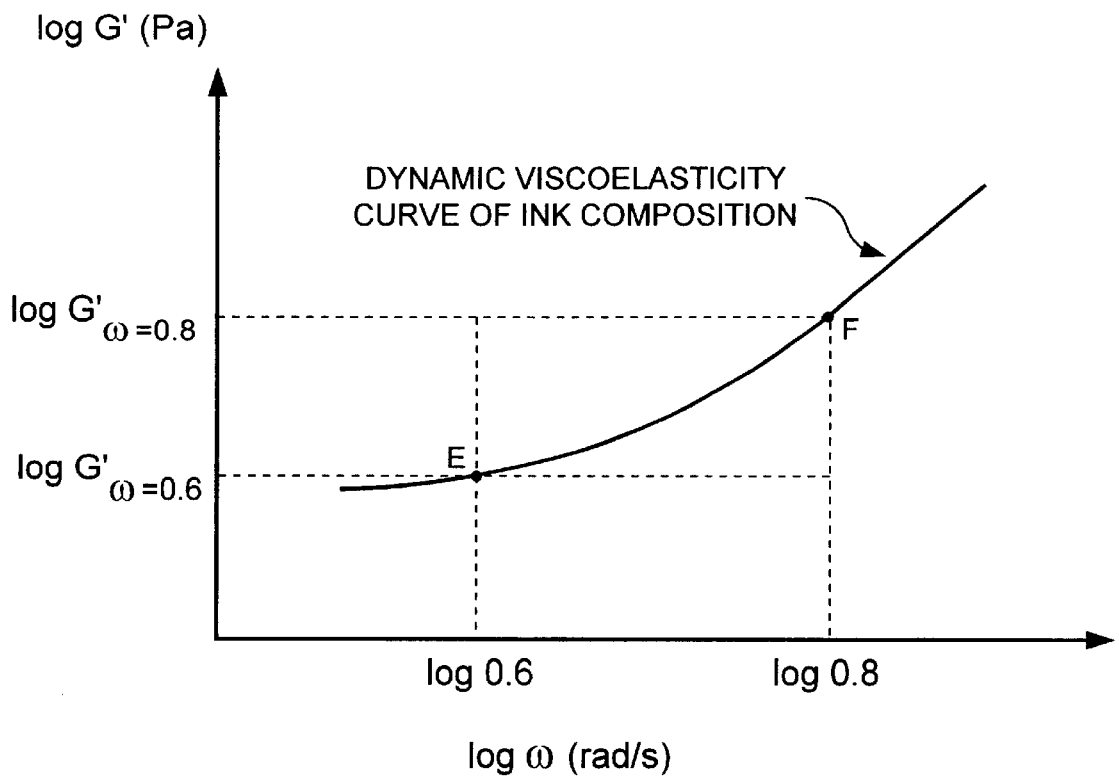
FIG. 3 is a schematic view of a flowing characteristic curve of a pigment ink at 20° C. for explaining the fourth ink set of the invention.
Figure 5:
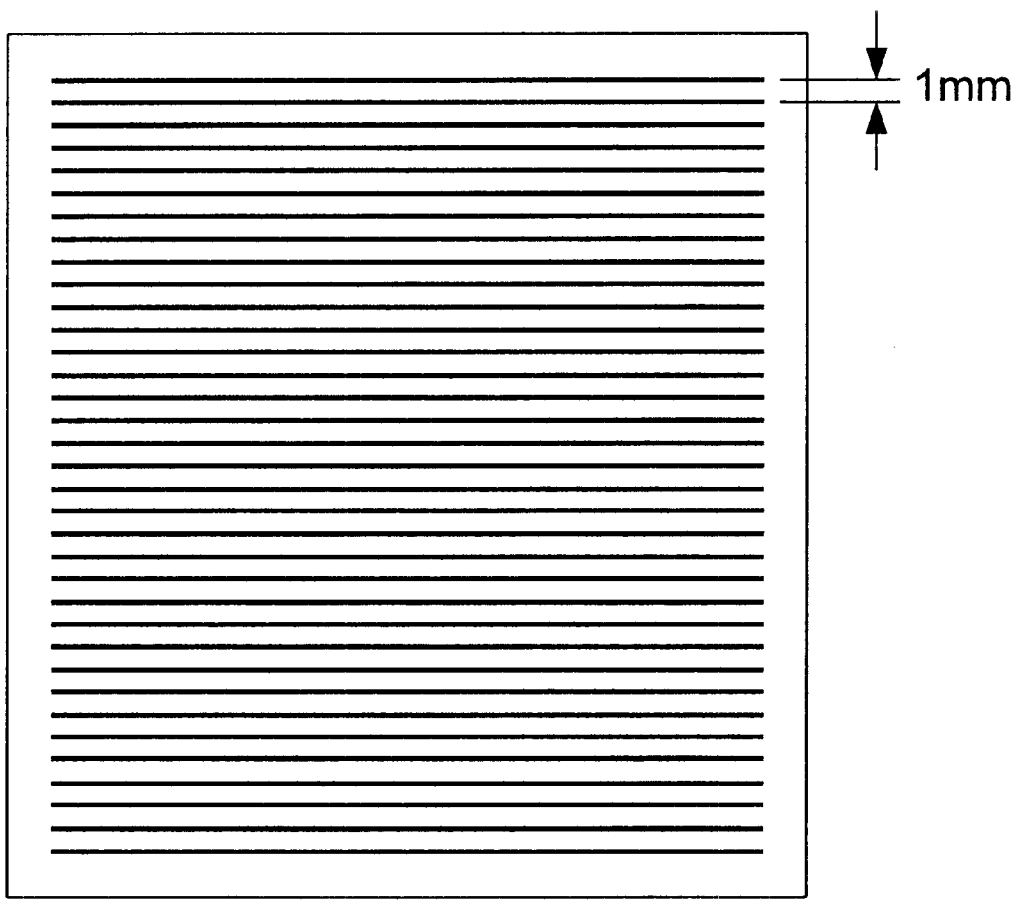
FIG. 5 is a diagram illustrating a line pattern for measuring the jetting stability of the ink composition.

| | Zero shear viscosity (mPa · s) | Difference in zero shear viscosity | Slope of sinθ vs. viscosity curve | Difference in slope of sinθ vs. viscosity curve | Slope of line AB (refer to FIG. 1) | Slope of line CD (refer to FIG. 2) | Slope of line EF (refer to FIG. 3) | Evaluation (1)/Test on image quality by line pattern (the number of paper sheets at which curve appeared) |
|---|---|---|---|---|---|---|---|---|
| Ex. 1 | | | | | | | | |
| M | 4.33 | 0 | −0.0620 | 0 | 0.76 | 0.76 | 1.52 | 2000 |
| C | 4.33 | | −0.0620 | | 0.76 | 0.76 | 1.52 | 2000 |
| Y | 4.33 | | −0.0620 | | 0.76 | 0.76 | 1.52 | 2000 |
| Comp. | | | | | | | | |

TABLE 6-continued

| | Zero shear viscosity (mPa · s) | Difference in zero shear viscosity | Slope of sinθ vs. viscosity curve | Difference in slope of sinθ vs. viscosity curve | Slope of line AB (refer to FIG. 1) | Slope of line CD (refer to FIG. 2) | Slope of line EF (refer to FIG. 3) | Evaluation (1)/Test on image quality by line pattern (the number of paper sheets at which curve appeared) |
|---|---|---|---|---|---|---|---|---|
| Ex. 1 | | | | | | | | |
| B | 4.70 | 0.37 | −0.1420 | 0.080 | 0.45 | 0.45 | 0.90 | 100 |
| M | 4.33 | | −0.0620 | | 0.76 | 0.76 | 1.52 | 2000 |
| C | 4.33 | | −0.0620 | | 0.76 | 0.76 | 1.52 | 2000 |
| Y | 4.70 | | −0.1420 | | 0.45 | 0.45 | 0.90 | 100 |

TABLE 7

| Ink set | Zero shear viscosity (mPa · s) | Difference in zero shear viscosity | Slope of sinθ vs. viscosity curve | Difference in slope of sinθ vs. viscosity curve | Slope of line AB (refer to FIG. 1) | Slope of line CD (refer to FIG. 2) | Slope of line EF (refer to FIG. 3) | Evaluation (1)/Test on image quality by line pattern (the number of paper sheets at which curve appeared) |
|---|---|---|---|---|---|---|---|---|
| Ex. 2 | | | | | | | | |
| B | 4.10 | 0 | −0.0390 | 0 | 0.85 | 0.85 | 1.70 | 3000 |
| M | 4.10 | | −0.0390 | | 0.85 | 0.85 | 1.70 | 3000 |
| C | 4.10 | | −0.0390 | | 0.85 | 0.85 | 1.70 | 3000 |
| Y | 4.10 | | −0.0390 | | 0.85 | 0.85 | 1.70 | 3000 |
| Ex. 3 | | | | | | | | |
| B | 4.10 | 0 | −0.0210 | 0 | 0.92 | 0.92 | 1.84 | Not appeared at 4000 |
| M | 4.10 | | −0.0210 | | 0.92 | 0.92 | 1.84 | Not appeared at 4000 |
| C | 4.10 | | −0.0210 | | 0.92 | 0.92 | 1.84 | Not appeared at 4000 |
| Y | 4.10 | | −0.0210 | | 0.92 | 0.92 | 1.84 | Not appeared at 4000 |
| Ex. 4 | | | | | | | | |
| B | 4.10 | 0 | −0.0130 | 0 | 0.95 | 0.95 | 1.90 | Not appeared at 4000 |
| M | 4.10 | | −0.0130 | | 0.95 | 0.95 | 1.90 | Not appeared at 4000 |
| C | 4.10 | | −0.0130 | | 0.95 | 0.95 | 1.90 | Not appeared at 4000 |
| Y | 4.10 | | −0.0130 | | 0.95 | 0.95 | 1.90 | Not appeared at 4000 |
| Ex. 5 | | | | | | | | |
| B | — | — | — | — | 0.90 | 0.90 | 1.80 | Not appeared at 4000 |
| M | — | | — | | 0.90 | 0.90 | 1.80 | Not appeared at 4000 |
| C | — | | — | | 0.90 | 0.90 | 1.80 | Not appeared at 4000 |
| Y | — | | — | | 0.90 | 0.90 | 1.80 | Not appeared at 4000 |
| Ex. 6 | | | | | | | | |
| B | — | — | — | — | 0.92 | 0.92 | 1.84 | Not appeared at 4000 |
| M | — | | — | | 0.92 | 0.92 | 1.84 | Not appeared at 4000 |
| C | — | | — | | 0.92 | 0.92 | 1.84 | Not appeared at 4000 |
| Y | — | | — | | 0.92 | 0.92 | 1.84 | Not appeared at 4000 |
| Ex. 7 | | | | | | | | |
| B | — | — | — | — | 0.95 | 0.95 | 1.90 | Not appeared at 4000 |
| M | — | | — | | 0.95 | 0.95 | 1.90 | Not appeared at 4000 |
| C | — | | — | | 0.95 | 0.95 | 1.90 | Not appeared at 4000 |
| Y | — | | — | | 0.95 | 0.95 | 1.90 | Not appeared at 4000 |

TABLE 8

| Ink set | Zero shear viscosity (mPa · s) | Difference in zero shear viscosity | Slope of sinθ vs. viscosity curve | Difference in slope of sinθ vs. viscosity curve | Slope of line AB (refer to FIG. 1) | Slope of line CD (refer to FIG. 2) | Slope of line EF (refer to FIG. 3) | Evaluation (1)/Test on image quality by line pattern (the number of paper sheets at which curve appeared) |
|---|---|---|---|---|---|---|---|---|
| Ex. 8 | | | | | | | | |
| B | — | — | — | — | 0.95 | 0.95 | 1.90 | Not appeared at 4000 |
| M | — | | — | | 0.95 | 0.95 | 1.90 | Not appeared at 4000 |
| C | — | | — | | 0.95 | 0.95 | 1.90 | Not appeared at 4000 |
| Y | — | | — | | 0.95 | 0.95 | 1.90 | Not appeared at 4000 |

TABLE 8-continued

| Ink set | Zero shear viscosity (mPa · s) | Difference in zero shear viscosity | Slope of sinθ vs. viscosity curve | Difference in slope of sinθ vs. viscosity curve | Slope of line AB (refer to FIG. 1) | Slope of line CD (refer to FIG. 2) | Slope of line EF (refer to FIG. 3) | Evaluation (1)/Test on image quality by line pattern (the number of paper sheets at which curve appeared) |
|---|---|---|---|---|---|---|---|---|
| Ex. 9 | | | | | | | | |
| M | — | — | — | — | 0.90 | 0.90 | 1.80 | Not appeared at 4000 |
| C | — | | — | | 0.90 | 0.90 | 1.80 | Not appeared at 4000 |
| Y | | | — | | 0.90 | 0.90 | 1.80 | Not appeared at 4000 |
| Ex. 10 | | | | | | | | |
| M | 4.32 | 0.04 | −0.020 | 0.002 | 0.90 | 0.90 | 1.80 | Not appeared at 4000 |
| C | 4.28 | | −0.022 | | 0.89 | 0.89 | 1.78 | Not appeared at 4000 |
| Y | 4.28 | | −0.022 | | 0.89 | 0.89 | 1.78 | Not appeared at 4000 |
| Ex. 11 | | | | | | | | |
| M | 4.35 | 0.07 | −0.062 | 0.040 | 0.76 | 0.76 | 1.52 | 2000 |
| C | 4.28 | | −0.022 | | 0.89 | 0.89 | 1.78 | Not appeared at 4000 |
| Y | 4.28 | | −0.038 | | 0.89 | 0.89 | 1.78 | Not appeared at 4000 |
| Comp. Ex. 2 | | | | | | | | |
| M | 4.85 | 0.57 | −0.096 | 0.074 | 0.45 | 0.45 | 0.90 | 100 |
| C | 4.28 | | −0.022 | | 0.89 | 0.89 | 1.78 | Not appeared at 4000 |
| Y | 4.29 | | −0.022 | | 0.89 | 0.89 | 1.78 | Not appeared at 4000 |

The evaluation in the above-described Examples and Comparative Examples was conducted in the following manner.

(1) Test on Image Quality by Line Pattern (Refer to Tables 6 to 8

The ink set prepared in each of Examples 1 to 11 and Comparative Examples 1 and 2 was filled in an ink cartridge, and the ink cartridge was loaded on "Ink Jet Printer PM700C" (product of SEIKO EPSON). On super fine paper (made by SEIKO EPSON), lines were printed with intervals of 1 mm. Colors were changed by page (in the repeated order of black, yellow, cyan and magenta). For each of four colors, 4000 sheets were printed.

As a result, by using, for each of the ink sets of Examples 1 to 11, ink compositions having flowing characteristics or dynamic viscoelasticity at 20° C. adjusted to satisfy the above-specified flowing characteristics or the above-specified dynamic viscoelasticity, respectively, each ink exhibits jetting stability (a property of ink to be jetted stably in a predetermine direction from the head of an ink jet printer) and when used as an ink set, the image formed had high quality. Use of the ink set of each of Examples 1 to 11 having flowing characteristics or dynamic viscoelasticity adjusted to satisfy the above-described formula (I) or (IV), or (VII), respectively, realized high jetting stability and image of high quality. In particular, use of the ink set of each of Examples 2 to 10 having flowing characteristics or dynamic viscoelasticity adjusted to satisfy the above-described formula (II) or (V), or (VIII), respectively, realized higher jetting stability and image of higher quality.

Moreover, when the ink set of each of Examples 3 to 9 had flowing characteristics or dynamic viscoelasticity adjusted to satisfy the above-described formula (III) or (VI), or (IX), respectively, excellent jetting stability was attained and an image of markedly high quality was produced for a long operation time. In Comparative Examples 1 and 2, on the other hand, flowing characteristics or dynamic viscoelasticity of some ink compositions constituting the first to fourth ink sets did not satisfy the above-specified flowing characteristics or above-specified dynamic viscoelasticity. Owing to existence of the ink compositions which tended to cause disturbance in the ejecting direction, an image of high quality was not available.

(2) Test on Image Quality Using a Portrait

The ink set of each of Examples 1 to 11 and Comparative Examples 1 and 2 was filled in an ink cartridge and the cartridge was loaded on "Ink jet printer PM700C" (product of SEIKO EPSON). "Portrait", the name of the image (Sample No. 1, Identification number of image: N1) of highly fine color digital standard image data (ISO/JIS-SCID) was printed on 4000 sheets of PM photographic paper (trade name; product of SEIKO EPSON). The stability of the image was visually observed.

As a result, from 1 to 2000 sheets of paper recorded using the ink set of each of Examples 1 to 11 had a good image quality free from fluctuations in the jetting amount of ink among different colors and with good flight stability. When the ink set of each of Examples 3 to 10 was employed, 1 to 4000 sheets of paper thus recorded had a markedly high image quality, free of fluctuations in the jetting amount of ink among different colors and with excellent flight stability. The image recorded on the sheets of paper using the ink set of each of Comparative Examples 1 and 2, however, did not have high quality because of fluctuations in the jetting amount among inks.

(3) Precipitation of Pigment

Precipitation of the pigment in each of the inks constituting the ink set of each of Examples was measured at room temperature by using "Turbiscan MA1000", an apparatus for measuring intensity distribution of each of back scattering light and transmitted light in the height-wise direction of the sample. A precipitating phenomenon was hardly observed from the ink set of each of Examples 2 to 10 even after two hours after preparation of the ink, while it was observed in the black ink and yellow ink, among the ink compositions of the ink set in Comparative Example 1.

INDUSTRIAL APPLICABILITY

The ink set of the invention exhibits good jetting stability, suppresses fluctuations in the jetting amount of the ink among different colors with high accuracy, and therefore, is able to provide an image of high quality.

According to the preparation process of an ink set according to the invention, an ink set exhibiting good jetting stability, suppressing fluctuations in the jetting amount of the ink among different colors with high accuracy, and being capable of providing an image of high quality can be prepared easily.

Accordingly, by the image recording method of the invention, an image of high quality is available.

Moreover, according to the invention, recorded matter of a high image quality can be provided.

What is claimed is:

1. An ink jet recording ink set comprising a plurality of ink compositions each containing at least a colorant, a water-soluble organic solvent and water, wherein among said plurality of ink compositions, a difference in zero shear viscosity which is a value at sin θ=0 (θ=0) is 0.2 mPa·s or less and a difference in the slope of a sin θ vs. viscosity curve is within 0.04, said sin θ vs. viscosity curve being obtained by carrying out rolling-ball system measurement of the viscosity of each of the ink compositions under the temperature condition of 20° C. while changing an inclination angle θ to predetermined angles, determining the viscosity at the predetermined angles, and plotting the sin θ and the viscosity along the abscissa and the ordinate, respectively.

2. The ink jet recording ink set according to claim 1, wherein each of the ink compositions has a zero shear viscosity of 3 to 10 mPa·s and a slope of −0.1 to 0.

3. An inkjet recording ink set comprising a plurality of ink compositions each containing at least a colorant, a water-soluble organic solvent and water, wherein each of said plurality of ink compositions has flowing characteristics at 20° C. set to satisfy the following expression (I):

$$0.6 \leq \frac{\log \sigma_{\gamma=5} - \log \sigma_{\gamma=3}}{\log 5 - \log 3} \quad (I)$$

wherein $\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

4. The ink jet recording ink set according to claim 3, wherein the flowing characteristics at 20° C. is set to satisfy the following expression (II):

$$0.8 \leq \frac{\log \sigma_{\gamma=5} - \log \sigma_{\gamma=3}}{\log 5 - \log 3} \leq 1 \quad (II)$$

wherein $\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

5. The ink jet recording ink set according to claim 3, wherein the flowing characteristics at 20° C. are set to satisfy the following expression (III):

$$0.9 \leq \frac{\log \sigma_{\gamma=5} - \log \sigma_{\gamma=3}}{\log 5 - \log 3} \leq 1 \quad (III)$$

wherein $\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

6. An ink jet recording ink set comprising a plurality of ink compositions each containing at least a colorant, a water-soluble organic solvent and water, wherein each of said plurality of ink compositions having flowing characteristics at 20° C. set to satisfy the below-described expression (IV):

$$0.6 \leq \frac{\log \sigma_{\gamma=4\times10^4} - \log \sigma_{\gamma=3\times10^4}}{\log(4\times10^4) - \log(3\times10^4)} \leq 1 \quad (IV)$$

wherein $\sigma_{\gamma=3\times10^4}$: shear stress (Pa) when the shear rate of the ink is $3\times10^4$ (sec$^{-1}$), and $\sigma_{\gamma=4\times10^4}$: shear stress (Pa) when the shear rate of the ink is $4\times10^4$ (sec$^{-1}$).

7. The ink jet recording ink set according to claim 6, wherein said flowing characteristics at 20° C. are set to satisfy the following expression (V):

$$0.8 \leq \frac{\log \sigma_{\gamma=4\times10^4} - \log \sigma_{\gamma=3\times10^4}}{\log(4\times10^4) - \log(3\times10^4)} \leq 1 \quad (V)$$

wherein $\sigma_{\gamma=3\times10^4}$: shear stress (Pa) when the shear rate of the ink is $3\times10^4$ (sec$^{-1}$), and $\sigma_{\gamma=4\times10^4}$: shear stress (Pa) when the shear rate of the ink is $4\times10^4$ (sec$^{-1}$).

8. The ink jet recording ink set according to claim 6, wherein said flowing characteristics at 20° C. are set to satisfy the following formula (VI):

$$0.9 \leq \frac{\log \sigma_{\gamma=4\times10^4} - \log \sigma_{\gamma=3\times10^4}}{\log(4\times10^4) - \log(3\times10^4)} \leq 1 \quad (VI)$$

wherein $\sigma_{\gamma=3\times10^4}$: shear stress (Pa) when the shear rate of the ink is $3\times10^4$ (sec$^{-1}$), and $\sigma_{\gamma=4\times10^4}$: shear stress (Pa) when the shear rate of the ink is $4\times10^4$ (sec$^{-1}$).

9. An ink jet recording ink set comprising a plurality of ink compositions each containing at least a colorant, a water-soluble organic solvent and water, wherein each of said plurality of ink compositions has dynamic viscoelasticity at 20° C. set to satisfy the following expression (VII):

$$1.2 \leq \frac{\log G'_{\omega=0.8} - \log G'_{\omega=0.6}}{\log 0.8 - \log 0.6} \leq 2 \quad (VII)$$

wherein $G'_{\omega=0.6}$: storage shear modulus (Pa) when frequency (ω) applied to the ink composition is 0.6 rad/s, and, $G'_{\omega=0.8}$: storage shear modulus (Pa) when frequency (ω) applied to the ink composition is 0.8 rad/s.

10. The ink jet recording ink set according to claim 9, wherein said dynamic viscoelasticity at 20° C. is set to satisfy the following expression (VIII):

$$1.6 \leq \frac{\log G'_{\omega=0.8} - \log G'_{\omega=0.6}}{\log 0.8 - \log 0.6} \leq 2 \quad (VIII)$$

wherein $G'_{\omega=0.6}$: storage shear modulus (Pa) when applied frequency (ω) to the ink composition is 0.6 rad/s, and, $G'_{\omega=0.8}$: storage shear modulus (Pa) when applied frequency ($\omega$) to the ink composition is 0.8 rad/s.

11. The ink jet recording ink set according to claim 9, wherein said dynamic viscoelasticity at 20° C. is set to satisfy the following expression (IX):

$$1.8 \leq \frac{\log G'_{\omega=0.8} - \log G'_{\omega=0.6}}{\log 0.8 - \log 0.6} \leq 2 \qquad \text{(IX)}$$

wherein $G'_{\omega=0.6}$: storage shear modulus (Pa) when applied frequency ($\omega$) to the ink composition is 0.6 rad/s, and, $G'_{\omega=0.8}$: storage shear modulus (Pa) when applied frequency ($\omega$) to the ink composition is 0.8 rad/s.

12. The ink jet recording ink set according to any one of claims 1, 3, 6 and 9, wherein the colorant is a pigment.

13. The ink jet recording set according to any one of claims 1, 3 6 and 9, wherein the colorant is a self-dispersion type pigment.

14. The ink jet recording ink set according to claim 13, wherein said self-dispersion type pigment has a surface hydrophilized with a functional group selected from the class consisting of carbonyl, carboxyl, hydroxyl, sulfone and sulfonic acid groups, and salts thereof.

15. The ink jet recording ink set according to any one of claims 1, 3, 6 and 9, wherein said colorant is a microencapsulated pigment.

16. The ink jet recording ink set according to claim 15, wherein said micro-encapsulated pigment is obtained by coating a pigment with a polymer compound.

17. The ink jet recording ink set according to claim 16, wherein said polymer compound mainly comprising at least one compound selected from the group consisting of vinyl-based polymer compounds, polyesters, polyamides, polyimides, polyurethanes, amino-based polymer compounds, silicon-containing polymers, sulfur-containing polymers, fluorine-containing polymers and epoxy resins.

18. The ink jet recording ink set according to claim 16, wherein said polymer compound is a crosslinked-structure-having polymer compound obtained by enclosing the pigment with an organic phase containing at least a polymer compound having a crosslinking reactive group and a hydrophilic group and a crosslinking agent and then carrying out crosslinking reaction.

19. The ink jet recording ink set according to claim 16, wherein said polymer compound is obtained by polymerizing a polymerizable surfactant having a polymerizable group, a hydrophobic group and a hydrophilic group with a monomer.

20. The ink jet recording ink set according to claim 19, wherein said polymerizable group is an unsaturated hydrocarbon group.

21. The ink jet recording ink set according to claim 20, wherein said unsaturated hydrocarbon group is at least one selected from the class consisting of vinyl, allyl, acryloyl, methacryloyl, propenyl, vinylidene and vinylene groups.

22. The ink jet recording ink set according to claim 19, wherein the hydrophilic group of said polymerizable surfactant is at least one selected from the class consisting of sulfone, sulfonic acid, carboxyl, carbonyl and hydroxyl groups and salts thereof.

23. The ink jet recording ink set according to claim 19, wherein said monomer contains a crosslinking monomer.

24. The ink jet recording ink set according to any one of claims 1, 3, 6 and 9, wherein said colorant is a water-insoluble or water-sparingly-soluble dye selected from disperse dyes and oil-soluble dyes.

25. The ink jet recording ink set according to any one of claims 1, 3, 6 and 9, wherein said colorant has been dispersed in an aqueous medium by a dispersant.

26. The ink jet recording ink set according to claim 25, wherein said dispersant is a polymer dispersant or a surfactant.

27. The ink jet recording ink set according to claim 26, wherein said polymer dispersant comprises a polymer having, in the molecule thereof, at least a moiety having an aromatic ring and/or an aliphatic ring and a moiety having a carboxyl group and/or a sulfonic acid group, and/or a salt thereof.

28. The ink jet recording ink set according to any one of claims 1, 3, 6 and 9, wherein said plurality of ink compositions each contains a polar solvent.

29. The ink jet recording ink set according to claim 28, wherein said polar solvent contains at least one solvent selected from the group consisting of 2-pyrrolidone, N-methylpyrrolidone, ε-caprolactam, dimethylsulfoxide, sulfolane, morpholine, N-ethylmorpholine and 1,3-dimethyl-2-imidazolidinone.

30. The ink jet recording ink set according to any one of claims 1, 3, 6 and 9, wherein said plurality of ink compositions each contains an anionic surfactant and/or a nonionic surfactant.

31. The ink jet recording ink set according to any one of claims 1, 3, 6 and 9, wherein said plurality of ink compositions each contains an acetylene glycol compound as the nonionic surfactant.

32. The ink jet recording ink set according to any one of claims 1, 3, 6 and 9, wherein said plurality of ink compositions each contains a glycol ether.

33. The ink jet recording ink set according to any one of claims 1, 3, 6 and 9, wherein said plurality of ink compositions each contains a 1,2-alkyldiol.

34. The ink jet recording ink set according to any one of claims 1, 3, 6 and 9, wherein each of said plurality of ink compositions has a surface-tension of 20 to 45 mN/m.

35. A process for preparing an ink jet recording ink set comprising a plurality of ink compositions each containing at least a colorant, a water-soluble organic solvent and water, which comprises adjusting said plurality of ink compositions so that a difference in zero shear viscosity which is a value at sin θ=0 (θ=0) is 0.2 mPa·s or less and a difference in the slope of a sin θ vs. viscosity curve is within 0.04, said sin θ vs. viscosity curve being obtained by carrying out rolling-ball system measurement of the viscosity of each of the ink compositions under the temperature condition of 20° C. while changing an inclination angle θ to predetermined angles, determining the viscosity at the predetermined angles, and plotting the sin θ and the viscosity along the abscissa and the ordinate, respectively.

36. The process for preparing an ink jet recording ink set according to claim 35, which comprises adjusting each of said plurality of ink compositions to have a zero shear viscosity of 3 to 10 mPa·s and a slope falling within a range of −0.1 to 0.

37. A process for preparing an ink jet recording ink set comprising a plurality of ink compositions each containing at least a colorant, a water-soluble organic solvent and water, which comprises adjusting flowing characteristics at 20° C. of each of said plurality of ink compositions to satisfy the following expression (I):

$$0.6 \leq \frac{\log \sigma_{\gamma=5} - \log \sigma_{\gamma=3}}{\log 5 - \log 3} \leq 1 \quad (I)$$

wherein $\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

38. The process for preparing an ink jet recording ink set according to claim 37, which comprises adjusting the flowing characteristics at 20° C. of each of said plurality of ink compositions to satisfy the following formula (II):

$$0.8 \leq \frac{\log \sigma_{\gamma=5} - \log \sigma_{\gamma=3}}{\log 5 - \log 3} \leq 1 \quad (II)$$

wherein $\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

39. The process for preparing an ink jet recording ink set according to claim 37, which comprises adjusting the flowing characteristics at 20° C. of each of said plurality of ink compositions to satisfy the following expression (III):

$$0.9 \leq \frac{\log \sigma_{\gamma=5} - \log \sigma_{\gamma=3}}{\log 5 - \log 3} \leq 1 \quad (III)$$

wherein $\sigma_{\gamma=3}$: shear stress (Pa) when the shear rate of the ink is 3 (sec$^{-1}$), and $\sigma_{\gamma=5}$: shear stress (Pa) when the shear rate of the ink is 5 (sec$^{-1}$).

40. A process for preparing an ink jet recording ink set comprising a plurality of ink compositions each containing at least a colorant, a water-soluble organic solvent and water, which comprises adjusting flowing characteristics at 20° C. of each of said plurality of ink compositions to satisfy the following expression (IV):

$$0.6 \leq \frac{\log \sigma_{\gamma=4 \times 10^4} - \log \sigma_{\gamma=3 \times 10^4}}{\log(4 \times 10^4) - \log(3 \times 10^4)} \leq 1 \quad (IV)$$

wherein $\sigma_{\gamma=3 \times 10^4}$: shear stress (Pa) when the shear rate of the ink is $3 \times 10^4$ (sec$^{-1}$), and $\sigma_{\gamma=4 \times 10^4}$: shear stress (Pa) when the shear rate of the ink is $4 \times 10^4$ (sec$^{-1}$).

41. The process for preparing an ink jet recording ink set according to claim 40, which comprises adjusting the flowing characteristics at 20° C. of each of said plurality of ink compositions to satisfy the following formula (V):

$$0.8 \leq \frac{\log \sigma_{\gamma=4 \times 10^4} - \log \sigma_{\gamma=3 \times 10^4}}{\log(4 \times 10^4) - \log(3 \times 10^4)} \leq 1 \quad (V)$$

wherein $\sigma_{\gamma=3 \times 10^4}$: shear stress (Pa) when the shear rate of the ink is $3 \times 10^4$ (sec$^{-1}$), and $\sigma_{\gamma=4 \times 10^4}$: shear stress (Pa) when the shear rate of the ink is $4 \times 10^4$ (sec$^{-1}$).

42. The process for preparing an ink jet recording ink set according to claim 40, which comprises adjusting the flowing characteristics at 20° C. of each of said plurality of ink compositions to satisfy the following formula (VI):

$$0.9 \leq \frac{\log \sigma_{\gamma=4 \times 10^4} - \log \sigma_{\gamma=3 \times 10^4}}{\log(4 \times 10^4) - \log(3 \times 10^4)} \leq 1 \quad (VI)$$

wherein $\sigma_{\gamma=3 \times 10^4}$: shear stress (Pa) when the shear rate of the ink is $3 \times 10^4$ (sec$^{-1}$), and $\sigma_{\gamma=4 \times 10^4}$: shear stress (Pa) when the shear rate of the ink is $4 \times 10^4$ (sec$^{-1}$).

43. A process for preparing an ink jet recording ink set comprising a plurality of ink compositions each containing at least a colorant, a water-soluble organic solvent and water, which comprises adjusting dynamic viscoelasticity at 20° C. of each of said plurality of ink compositions to satisfy the following expression (VII):

$$1.2 \leq \frac{\log G'_{\omega=0.8} - \log G'_{\omega=0.6}}{\log 0.8 - \log 0.6} \leq 2 \quad (VII)$$

wherein $G'_{\omega=0.6}$: storage shear modulus (Pa) when frequency (ω) applied to the ink composition is 0.6 rad/s, and, $G'_{\omega=0.8}$: storage shear modulus (Pa) when frequency (ω) applied to the ink composition is 0.8 rad/s.

44. The process for preparing an ink jet recording ink set according to claim 43, which comprises adjusting the dynamic viscoelasticity at 20° C. of each of said plurality of ink compositions to satisfy the following expression (VIII):

$$1.6 \leq \frac{\log G'_{\omega=0.8} - \log G'_{\omega=0.6}}{\log 0.8 - \log 0.6} \leq 2 \quad (VIII)$$

wherein $G'_{\omega=0.6}$: storage shear modulus (Pa) when frequency (ω) applied to the ink composition is 0.6 rad/s, and, $G'_{\omega=0.8}$: storage shear modulus (Pa) when frequency (ω) applied to the ink composition is 0.8 rad/s.

45. The process for preparing an ink jet recording ink set according to claim 43, which comprises adjusting the dynamic viscoelasticity at 20° C. of each of said plurality of ink compositions to satisfy the following expression (IX):

$$1.8 \leq \frac{\log G'_{\omega=0.8} - \log G'_{\omega=0.6}}{\log 0.8 - \log 0.6} \leq 2 \quad (IX)$$

wherein $G'_{\omega=0.6}$: storage shear modulus (Pa) when frequency (ω) applied to the ink composition is 0.6 rad/s, and, $G'_{\omega=0.8}$: storage shear modulus (Pa) when frequency (ω) applied to the ink composition is 0.8 rad/s.

46. The ink jet recording ink set according to any one of claims 1, 3, 6 and 9, wherein said plurality of ink compositions each contains polymer fine particles.

47. The ink jet recording ink set according to claim 46 wherein said polymer fine particles are fine particles having a film forming property, having on the surface thereof a hydrophilic group and having a particle size of 50 to 200 nm.

48. The ink jet recording ink set according to claim 47, wherein said hydrophilic group is a sulfonic acid group or a salt thereof.

49. The ink jet recording ink set according to claim 46, wherein said polymer fine particles have been added, in the form of a polymer emulsion having water as a continuous phase, to each of said plurality of ink compositions.

50. An image recording method, which comprises forming an image by using an ink jet recording ink set according to any one of claims 1, 3, 6 and 9.

51. Recorded matter having an image formed thereon by using an ink jet recording ink set according to any one of claims 1, 3, 6 and 9.

\* \* \* \* \*